United States Patent
Timmer et al.

(10) Patent No.: US 12,240,712 B2
(45) Date of Patent: Mar. 4, 2025

(54) METHOD AND APPARATUS FOR STACKING LUMBER

(71) Applicant: Eagle Machinery & Supply, Inc., Sugarcreek, OH (US)

(72) Inventors: Andrew D. Timmer, Graand Haven, MI (US); Reuben R Schlabach, Dundee, OH (US); Edward M Hershberger, Apple Creek, OH (US); Andrew C Sampsel, Coshocton, OH (US); Corey M Kandel, Baltic, OH (US); Marvin L Raber, Sugarcreek, OH (US); Raymond A. Miller, Fresno, OH (US); Rudy A. Miller, Baltic, OH (US); Todd Spillman, Mineral City, OH (US); Kirk Spillman, Zoar, OH (US)

(73) Assignee: EAGLE MACHINERY & SUPPLY, INC., Sugarcreek, OH (US)

(*) Notice: Subject to any disclaimer, the term of this patent is extended or adjusted under 35 U.S.C. 154(b) by 0 days.

(21) Appl. No.: 18/357,649

(22) Filed: Jul. 24, 2023

(65) Prior Publication Data

US 2024/0300752 A1    Sep. 12, 2024

Related U.S. Application Data

(60) Provisional application No. 63/488,862, filed on Mar. 7, 2023.

(51) Int. Cl.
*B65G 57/14* (2006.01)
*B65G 47/26* (2006.01)
(Continued)

(52) U.S. Cl.
CPC ........... *B65G 57/14* (2013.01); *B65G 47/268* (2013.01); *B65G 47/766* (2013.01); *B65G 57/04* (2013.01);
(Continued)

(58) Field of Classification Search
CPC ....................... B65G 57/18; B65G 2201/0282; B65G 57/24; B65G 47/082; B65G 57/14;
(Continued)

(56) References Cited

U.S. PATENT DOCUMENTS 2,467,113 A * 4/1949 Deiters ................ F26B 25/003
414/789.5
3,618,288 A * 11/1971 Thornton ............. B65G 47/082
53/500

(Continued)

FOREIGN PATENT DOCUMENTS

DE    3210490 A  *  9/1982  ............. B65G 57/18
DE    3539762 A1 *  5/1987  ............. B65G 57/24

*Primary Examiner* — Gregory W Adams
(74) *Attorney, Agent, or Firm* — Sand, Sebolt & Wernow Co., LPA

(57) ABSTRACT

An assembly and method thereof creates a stack of objects. The assembly has a diverted to move objects having a desired size from a first conveyor to a second conveyor. The diverted utilizes diversion plates. The second conveyor transfers the objects to an accumulator. The objects that are accumulate are squared and then moved to a raised position. A lift assembly then lifts the accumulated objects that were square and translates the objects to a queuing assembly. The process repeats to construct a stack of objects with multiple layers of objects. The created stack of objects may then be transferred to a subsequent destination for further use or processing.

15 Claims, 29 Drawing Sheets

(51) Int. Cl.
*B65G 47/76* (2006.01)
*B65G 57/04* (2006.01)
*B65G 57/18* (2006.01)

(52) U.S. Cl.
CPC ...... B65G 57/18 (2013.01); *B65G 2201/0217* (2013.01); *B65G 2201/0282* (2013.01)

(58) Field of Classification Search
CPC .... B65G 47/268; B65G 47/766; B65G 57/04; B65G 2201/0217
USPC ......... 414/792.7, 788.9, 789.1, 789.2, 789.3, 414/791.6, 792.6
See application file for complete search history.

(56) References Cited

U.S. PATENT DOCUMENTS

| | | | | |
|---|---|---|---|---|
| 3,621,971 | A * | 11/1971 | Daniels, Sr. | B65G 47/54 198/600 |
| 4,159,058 | A * | 6/1979 | Zimmerman | B65G 57/18 414/789.2 |
| 4,674,785 | A * | 6/1987 | Riesenberg | B66C 1/0293 294/186 |
| 4,679,381 | A * | 7/1987 | Truninger | B65G 57/18 53/448 |
| 5,964,570 | A * | 10/1999 | Dimion | B65G 57/18 414/789.5 |
| 7,621,712 | B2 * | 11/2009 | Simmons | B65G 57/005 198/370.1 |
| 8,622,685 | B2 * | 1/2014 | Van Schijndel | B65G 47/90 414/789.9 |
| 10,994,947 | B2 * | 5/2021 | Middelberg | B65G 47/82 |
| 2003/0147737 | A1 * | 8/2003 | Pfeiffer | B65G 57/22 414/792.9 |

* cited by examiner

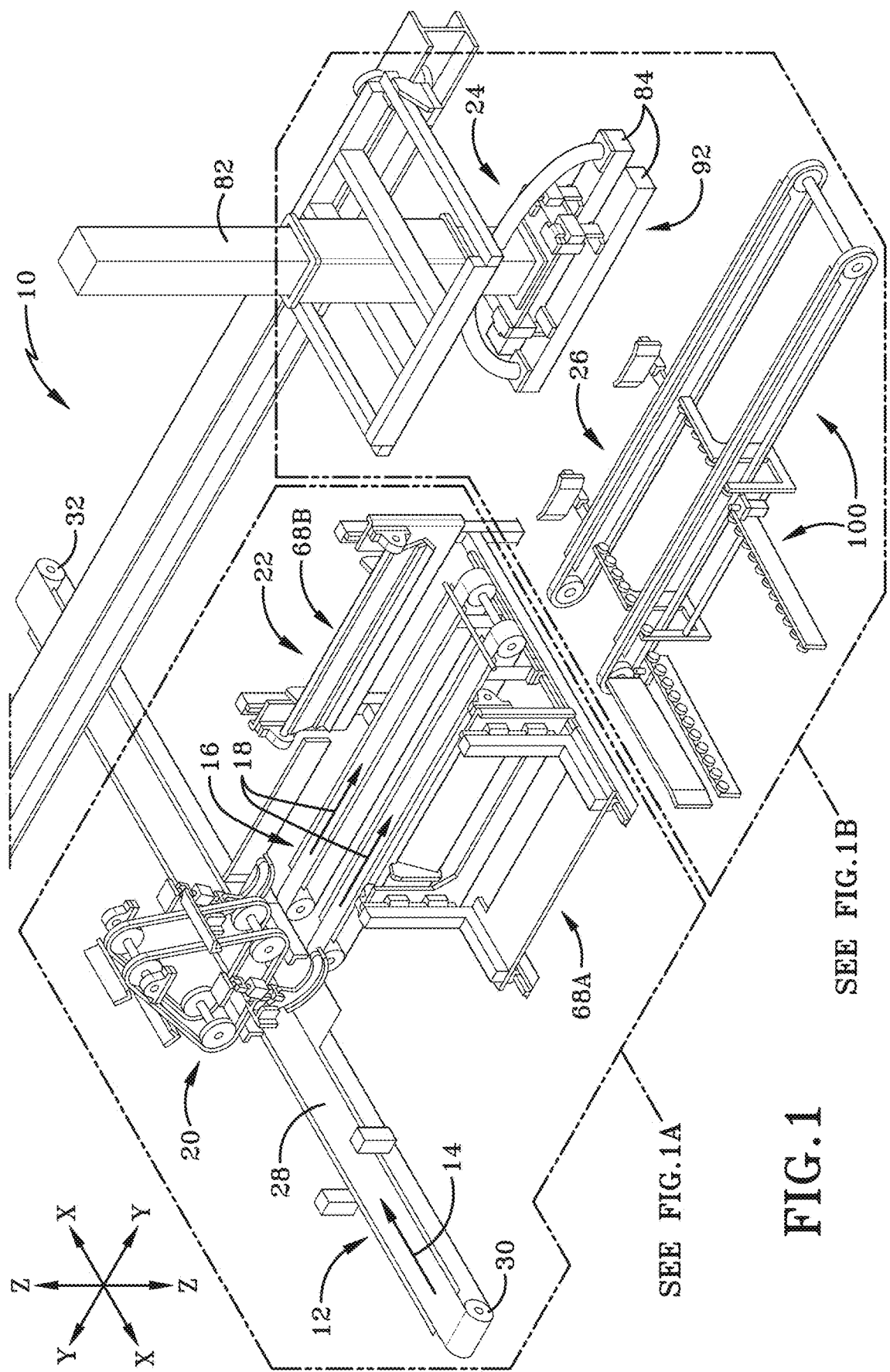

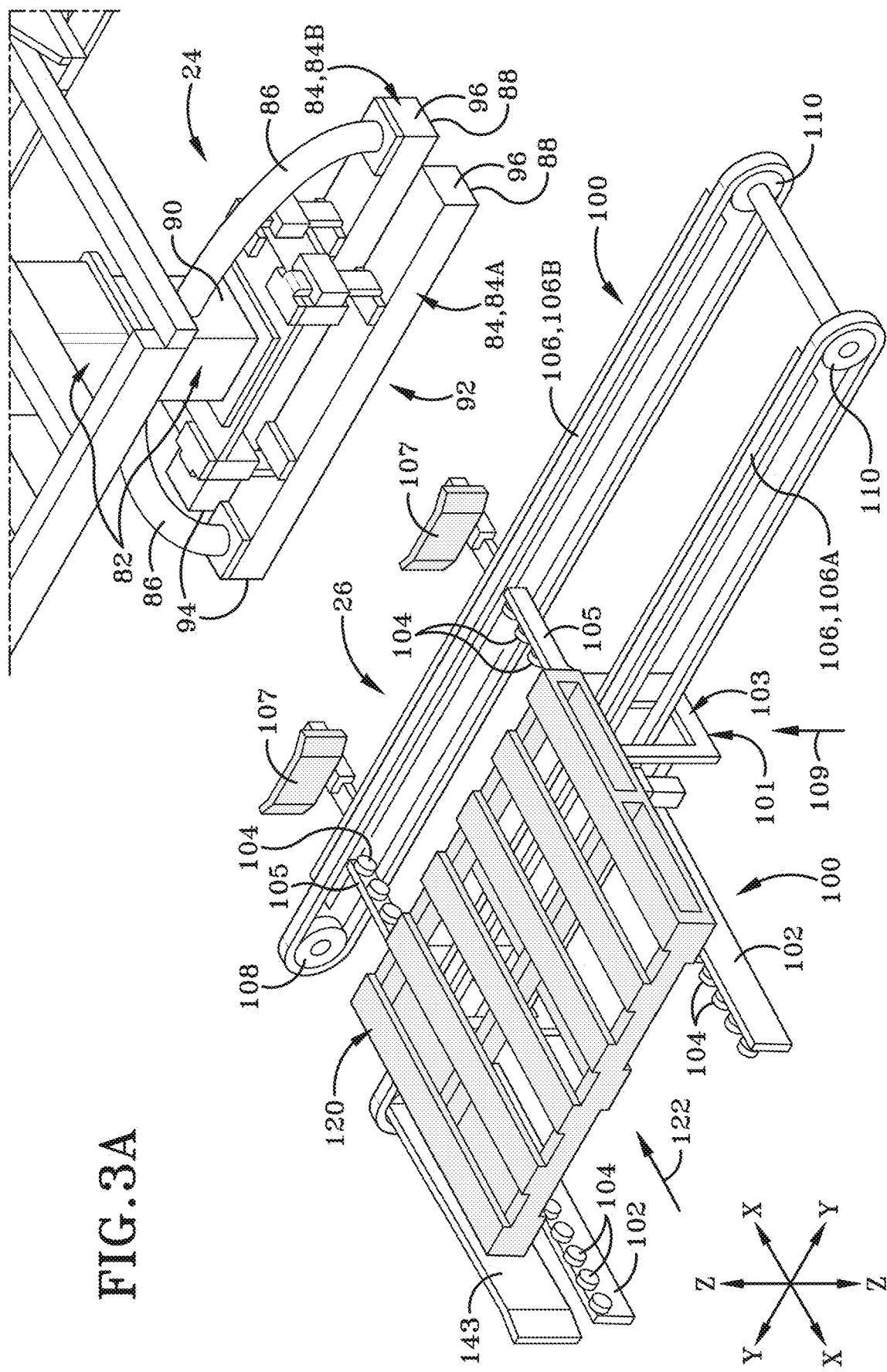

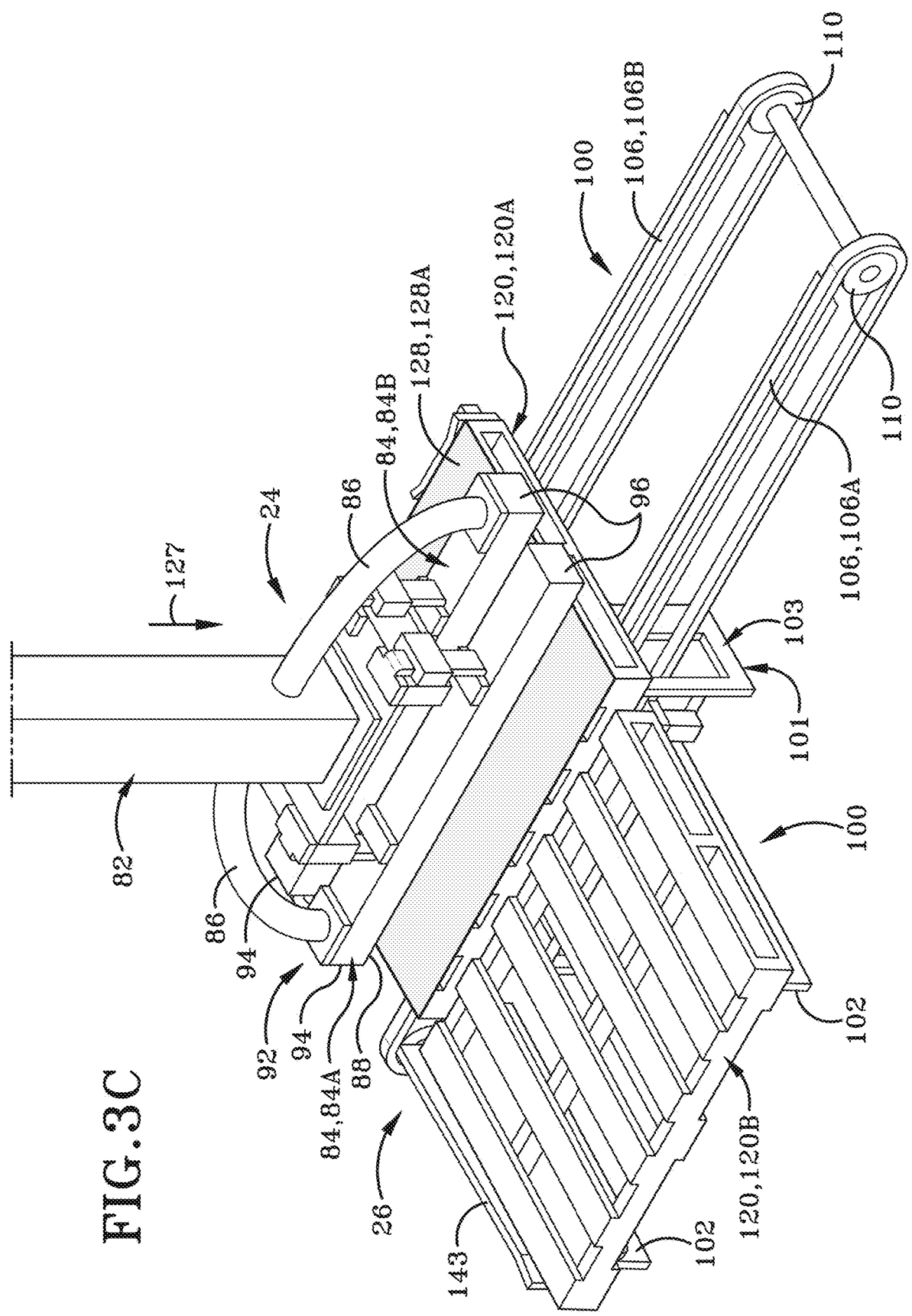

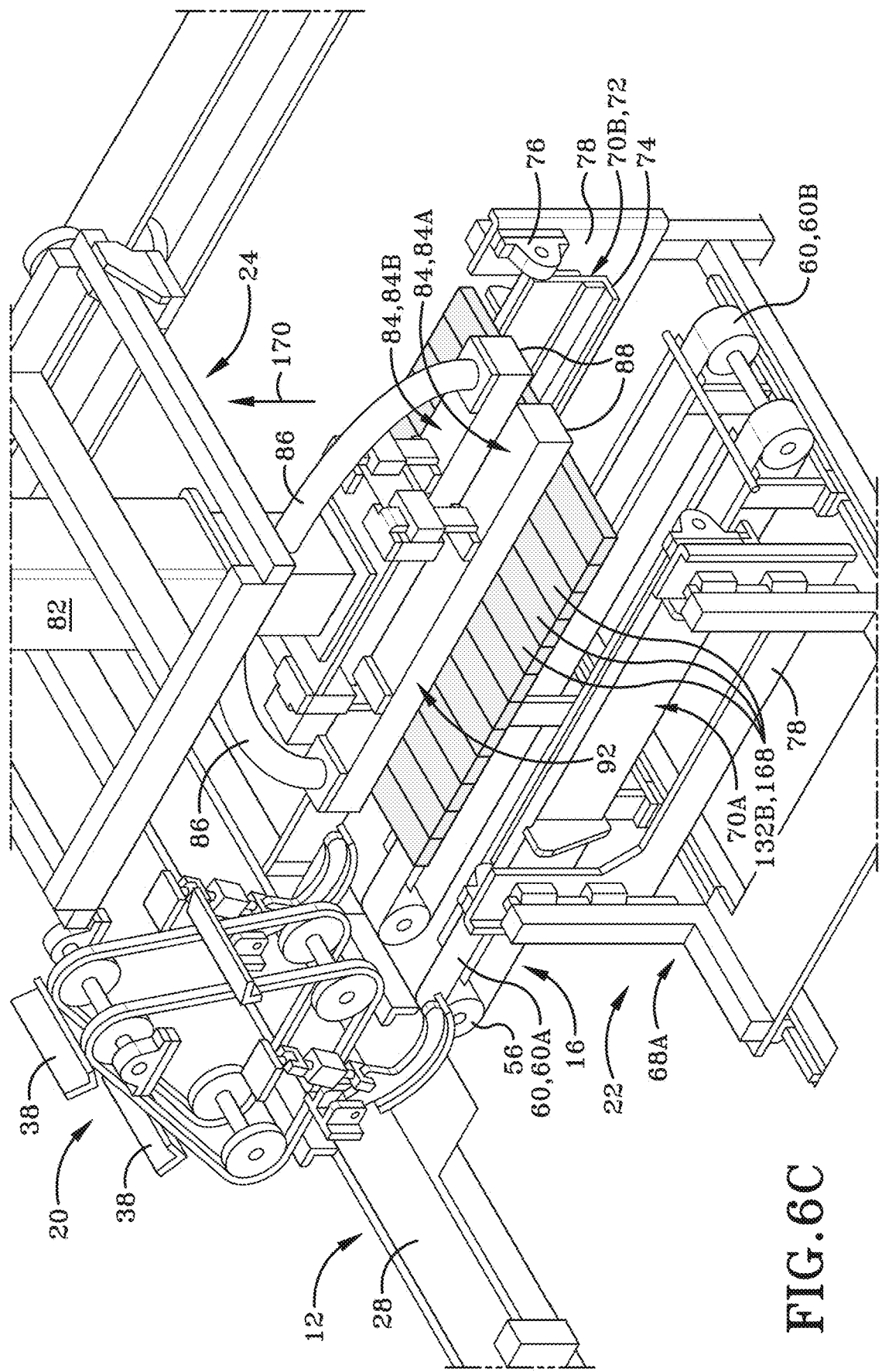

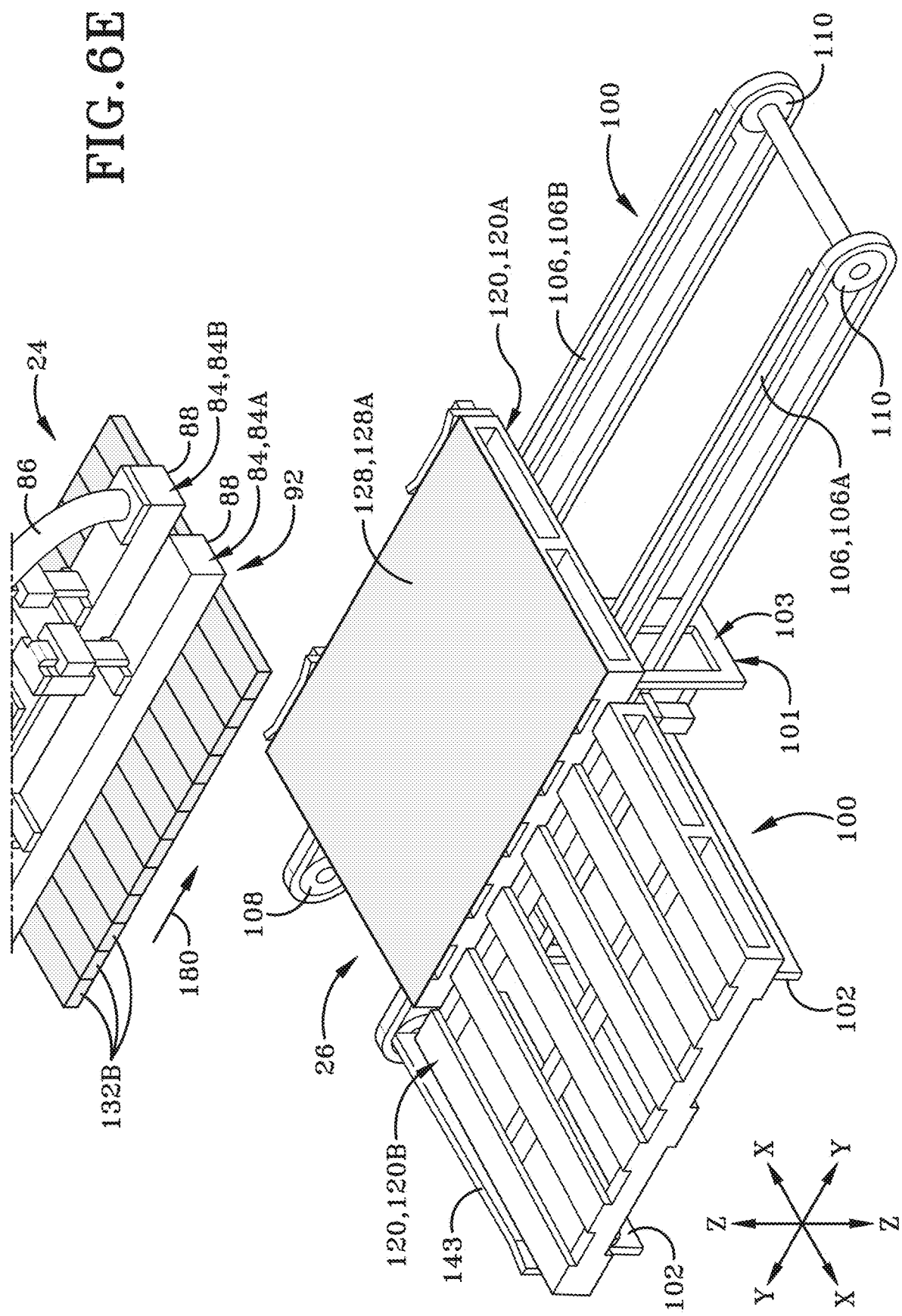

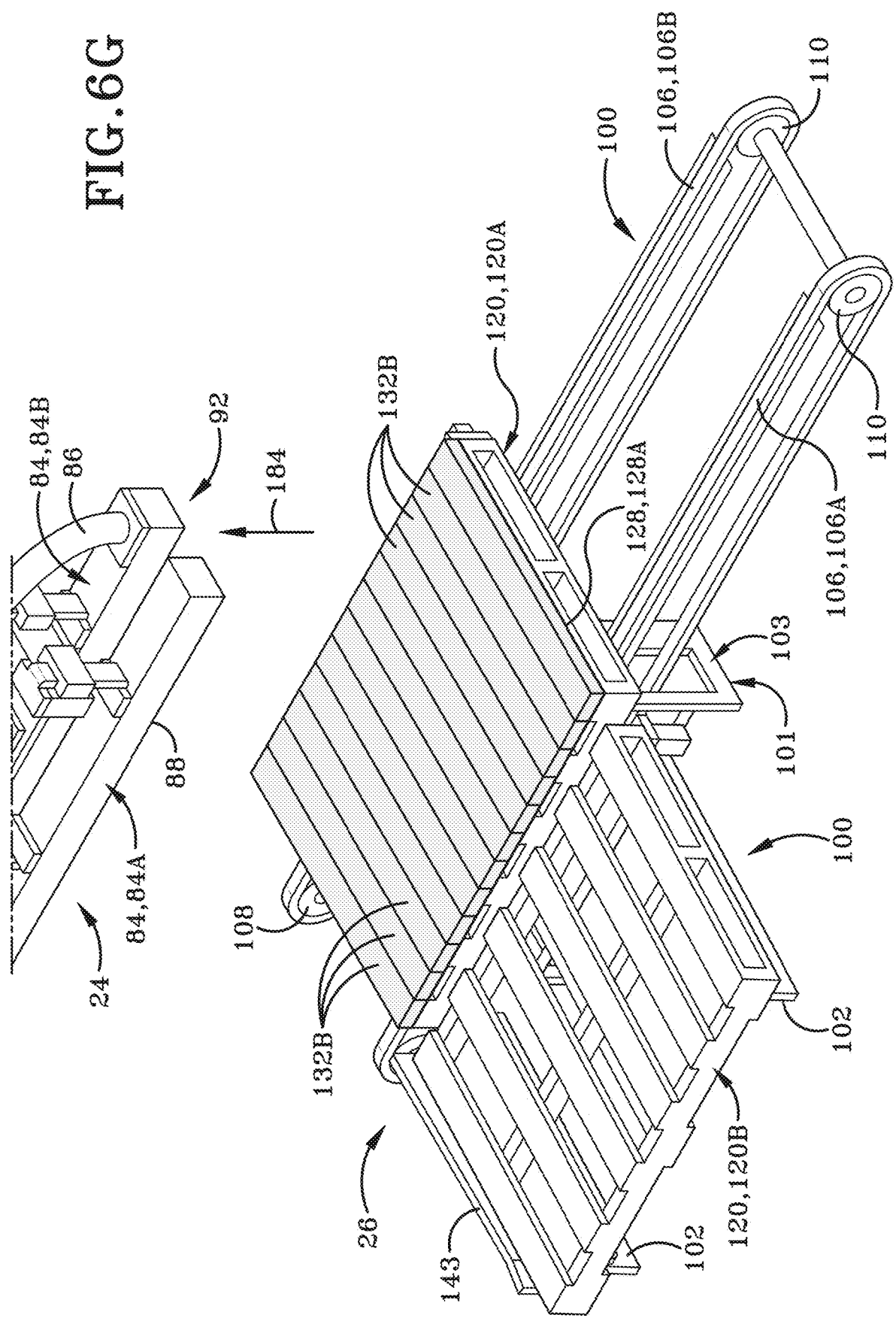

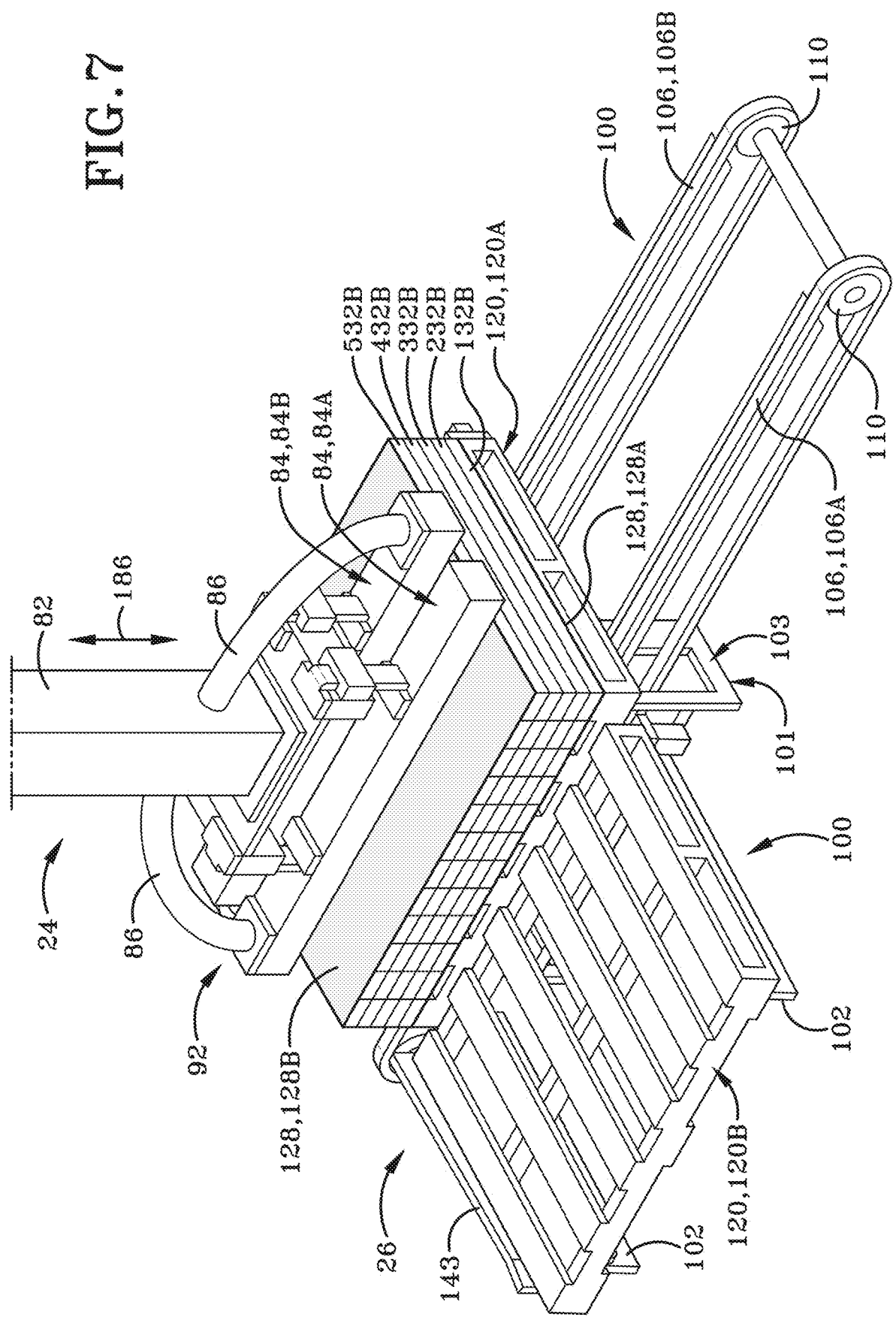

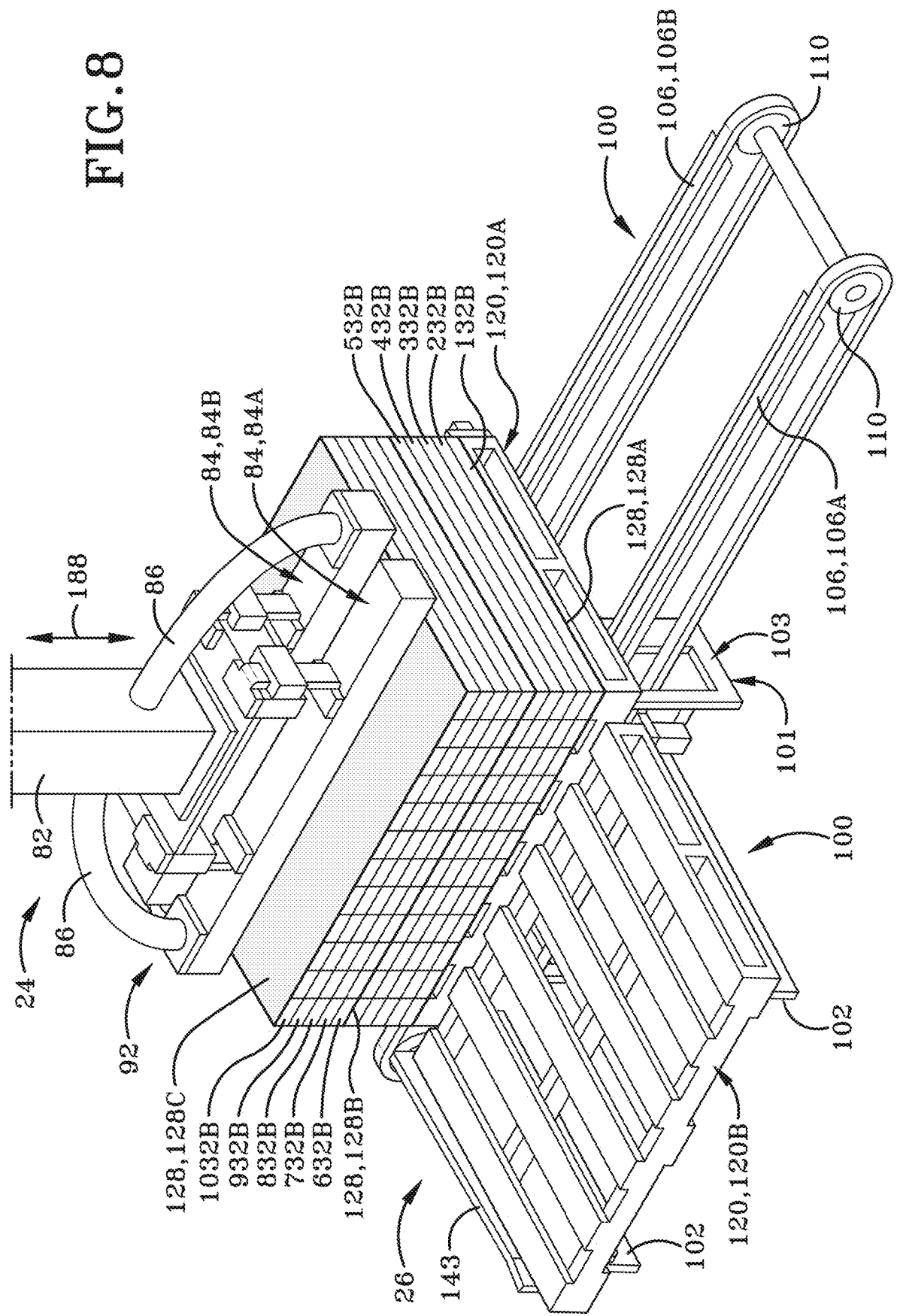

METHOD AND APPARATUS FOR STACKING LUMBER

CROSS-REFERENCE TO RELATED APPLICATIONS

This application claims the benefit of U.S. Provisional Application Ser. No. 63/488,862 filed Mar. 7, 2023, the disclosure of which is incorporated herein by reference in its entirety.

TECHNICAL FIELD

This disclosure is directed to devices, assemblies, and systems for handling objects.

BACKGROUND ART

Manufacturing facilities make or process items or objects in an effort to supply them to customers. Often, manufacturing facilities utilize a conveyor line or conveyor assembly to transport items or objects between different stations in a facility. For example, a first assembly may process an item in a first manner at a first station. Then, the item may be carried by a conveyor to a second assembly that processes the item in a second manner at a second station.

Sometimes, items or objects of various sizes travel along the conveyor between different stations. Sometimes, when a variety of items of objects travel along the same conveyor, they must be separated, segregated or sorted in order to group similar objects for subsequent processing or transport.

For example, wood barrel staves are objects that travel along conveyors in manufacturing facilities. Wood barrel staves are pieces of wood that are shaped generally as planks and are used to form a barrel when assembled by a cooper (or a mechanized cooper) in a cooperage. Currently, these wood barrel staves are produced in wood processing facilities in wood cutting machines that cut barrel staves into desired lengths. However, these wood cutting machines also cut wood to different lengths other than that required to be a barrel stave. As such, when wood exits the cutting machine, it may be either at a desired length of a barrel stave or at a different length such that the differing wood plank is used for a different purpose.

It is advantageous for items, such as wood staves, to be stacked evenly and squarely for safe handling, transport, and space minimization. This allows the stack of objects, such as staves, to be handled and transported to a cooperage for further processing and barrel production.

Although this background example was referenced with respect to wood staves, the creation of an even, squared stack of objects, regardless of the type of object is desirable but can be difficult.

SUMMARY OF THE INVENTION

Since creating an even, squared stack of objects, regardless of the type of object is difficult, a need exists for a system or assembly that can create a stack of objects. The present disclosure addresses this need amongst others. In one exemplary embodiment, the system or assembly of the present disclosure provides various machinery to create a stack of objects, such as wood barrel staves, however, the disclosure applies to any type of object for which a squared, even stack needs to be created.

In one aspect, an exemplary embodiment of the present disclosure may provide an assembly for handling objects that includes a diverter that may be servo drive to divert objects such as cut boards or staves. The diverter moves boards or staves from a sorter conveyor or second conveyor to layer build area or accumulator. There may diverter hold-downs or a hold-down mechanism that index in time with diverter to ensure boards or staves remain square. If the lift assembly or stacker is paused, turned off, or not able to keep up parts will automatically divert to and alternate location. There is an accumulator which may also be referred "build layer" that accumulates boards in layer until maximum width or maximum number of pieces is met, whichever comes first. The operator can set maximum width and maximum pieces on a programming interface, such as HMI. The board width and length data is read from the cutoff saw. When the layer is full, the accumulator will square ends of the boards and raise the layer so it can be picked up by a vacuum lift. When the objects are squared and raised, the vacuum lift with pick up the layer or row of objects. When a stacking area is ready to receive a layer or row of objects, they are placed as a layer or row on a pallet. When a predefined number of layers or rows are stacked, the assembly will automatically place cardboard on the stack. The number of layers between cardboard can be set on the HMI. When a predefined number of layers are on a stack, the vacuum lift will pause. If the stack accumulation area is clear, the completed stack will automatically move to an accumulation area. The maximum number of layers in a stack can be set on HMI. The operator places an empty pallet on pallet loading mechanism. When the stack is full and moves away pallet will automatically move to stacking area.

In another aspect, an exemplary embodiment of the present disclosure may provide an assembly for handling objects, the assembly comprising: a first conveyor defining a first path of travel for the objects, wherein the first conveyor conveys the objects along the first path of travel; a second conveyor defining a second path of travel for at least some of the objects, wherein the second path of travel is different than the first path of travel, and wherein the second conveyor conveys the at least some of the objects along the second path of travel; a diverter to divert the at least some of the objects from the first conveyor moving along the first path of travel to the second conveyor to move the at least some of the objects along the second path of travel; an accumulator in operative communication with the second conveyor, wherein the accumulator accumulates objects that were diverted until a selected amount of objects are accumulated; a lift assembly to lift the selected amount of objects that were accumulated in the accumulator, wherein the lift assembly moves between a first position and a second position, and wherein when the lift assembly is in the first position, the lift assembly lifts the selected amount of objects and retains the selected amount of objects while the lift assembly moves toward the second position; and a queuing assembly defining a queueing area, wherein the lift assembly moves to the second position to place the selected amount of objects on the queueing assembly in the queuing area, wherein the selected amount of objects that are placed onto the queueing assembly in the queuing area define a first layer of a stack of objects, wherein the lift assembly returns to the first position to lift another amount of selected objects and repeats the placement of selected objects in the queuing area to construct multiple layers of objects in the stack of objects.

In this exemplary embodiment, or another exemplary embodiment, the diverter may further comprises: a plurality of diversion plates that move in a loop, wherein one diversion plate from the plurality of diversion plates diverts one object from the first conveyor to the second conveyor. There may be a hold-down mechanism that is operationally subsequent to the plurality of diversion plates, wherein the hold-down mechanism holds the objects that have been diverted to the second conveyor, wherein the hold-down mechanism is in operation communication with the plurality of diversion plates to index in time the objects and ensure that each object that passes below the hold-down mechanism remains square relative to the second conveyor.

In this exemplary embodiment, or another exemplary embodiment, the accumulator may comprises: a first member on a first side of the second conveyor, wherein the first member pivots about a first pivot axis that is parallel to the second conveyor; a second member on a second side of the second conveyor, wherein the second member pivots about a second pivot axis that is parallel to the second conveyor; wherein the first and second members pivot between a widened first position and a clamped second position, wherein when the selected amount of objects are squared relative to the each other when clamped by the first and second members having been moved from the widened first positon to the clamped second position. The first member may be an L-shaped member and the second member may be an L-shaped member. The accumulator further may further comprise a first riser and a second riser, wherein the first riser is on a first portion of the accumulator disposed on the first side of the second conveyor and the second riser is on a second portion of the accumulator disposed on the second side of the second conveyor; wherein the first member is coupled to the first riser and the second member is coupled the second riser; wherein the first riser and a second riser are moveable in the vertical direction between a lowered position and a raised position. The accumulator further may further comprise a track in operative communication with the first portion of the accumulator to move in a direction that is perpendicular to the first pivot axis and the second pivot axis, wherein the first portion of the accumulator moves along the track between a first position and a second positon, wherein the first member and the second member are closer to each other in the second position than the first position. The risers move from the lowered position to raised position when the first portion of the accumulator is in the second position. The accumulator further may further comprise a retention bar position near an end of the second conveyor, wherein the retention bar is configured to stop and retain the selected objects above the second conveyor such that the selected objects may be clamped by the first and second members of the accumulator. When the first and second members are in the clamped second position, the first and second arms move from a lowered position to a raised positon along a vertical path of travel for the first and second arms with the objects retained between first and second arms;

In this exemplary embodiment, or another exemplary embodiment, the lift assembly may comprise a vacuum head assembly on the lift assembly that is configured to suction lift the selected amount of objects from the accumulator. There may be a first suction plate having a lower surface defining a plurality of holes that are in communication with a vacuum source that generates a suction force to be imparted through the plurality of holes to lift the selected amount of objects from the accumulator. The lower surface of the first suction plate engages a surface of at least one of the selected objects retained between first and second L-shaped members of the accumulator in a raised position, wherein the first suction plate retains the selected objects when the first and second L-shaped pivotally return to a widened position and are moved to a lowered position. The lift assembly may further comprise a telescoping member oriented in the vertical direction having an upper end and a lower end, the telescoping member configured to lengthen and retract in a telescoping manner, and the vacuum head assembly coupled to the lower end of the telescoping member such that the vacuum head assembly lowers and raises as the telescoping member lengthens and retracts. The lift assembly may further comprise a carriage that moves relative to a track to move the lift assembly between the first position and the second position, wherein the upper end of the telescoping member is coupled the carriage such that the telescoping member and vacuum head assembly move between the first potion and the second position; and wherein telescoping member is configured to lengthen and retract in a telescoping manner at both the first position and the second position.

In another aspect, and exemplary embodiment of the present disclosure may provide a method for handling objects, the method comprising: determining that an object moving along a first path of travel has a desired dimension; diverting, with a diverter, the object from the first path of travel to a second path of travel; accumulating, with an accumulator, a plurality of objects having the desired dimension; transferring the plurality of objects from the accumulator to a queuing assembly; repeating accumulation of objects having the desired dimension and transfer of objects from the accumulator to the queuing assembly; creating a stack of objects with multiple layers of the plurality of objects; and moving the stack of objects from the queuing assembly to another location. This exemplary method or another exemplary method may provide that diverting the object from the first path of travel to the second path of travel is accomplished by: moving a diversion plate across the first path of travel; contacting the object with the diversion plate; pushing the object with the diversion plate from the first path of travel to the second path of travel; moving a plurality of diversion plates around a loop. This exemplary method or another exemplary method may provide holding the object that was diverted by the diverter in a hold-down mechanism comprising a cantilevered member, wherein the cantilevered member contacts an upper surface of the object while the object is diverted from the first path of travel to the second path of travel. This exemplary method or another exemplary method may provide retaining the plurality of objects atop a conveyor via a retention bar; contacting respective ends of the plurality of objects with first and second L-shaped members on the accumulator; squaring the plurality of objects with the first and second L-shaped members; and raising the plurality of objects from a lowered position to a raised position with the first and second L-shaped members. This exemplary method or another exemplary method may provide that transferring the plurality of objects from the accumulator to a queuing assembly is accomplished by: lifting the plurality of objects with a lift assembly from the accumulator via a suctioning force; translating the lift assembly and plurality of objects from a first position above the accumulator to a second position above the queuing assembly; lowering the lift assembly; and releasing the suctioning force to place the plurality of objects onto a pallet or platform on the queuing assembly.

BRIEF DESCRIPTION OF THE DRAWINGS

Sample embodiments of the present disclosure are set forth in the following description, are shown in the drawings and are particularly and distinctly pointed out and set forth in the appended claims.

FIG. 1 is a isometric perspective view of an apparatus for handling objects according to an exemplary embodiment of the present disclosure.

FIG. 3A is an operational view depicting a pallet being loaded onto the queuing assembly, wherein the components that are primarily referenced with respect to their operational description are shown shaded.

FIG. 3C is an operational view depicting the lift assembly placing a first cardboard sheet on the first pallet, wherein the components that are primarily referenced with respect to their operational description are shown shaded.

FIG. 6C is an operational view of the lift assembly lifting the objects from the accumulator, wherein the components that are primarily referenced with respect to their operational description are shown shaded.

FIG. 6E is an operational view of the lift assembly moving the objects over the first pallet with a sheet of cardboard material placed on the first pallet, wherein the components that are primarily referenced with respect to their operational description are shown shaded.

FIG. 6G is an operational view of the lift assembly after having placed the objects onto the first pallet and the lift assembly being raised away from the objects, wherein the components that are primarily referenced with respect to their operational description are shown shaded.

FIG. 7 is an operational view depicting the placement of another cardboard sheet on top of five rows of objects that have been stacked through a process that repeats what has been shown in FIG. 4A-FIG. 6G.

FIG. 8 is an operational view of the lift assembly depicting a stack of objects after five additional rows and a third sheet of cardboard have been stacked.

Similar numbers refer to similar parts throughout the drawings.

DETAILED DESCRIPTION

Figure 1A:
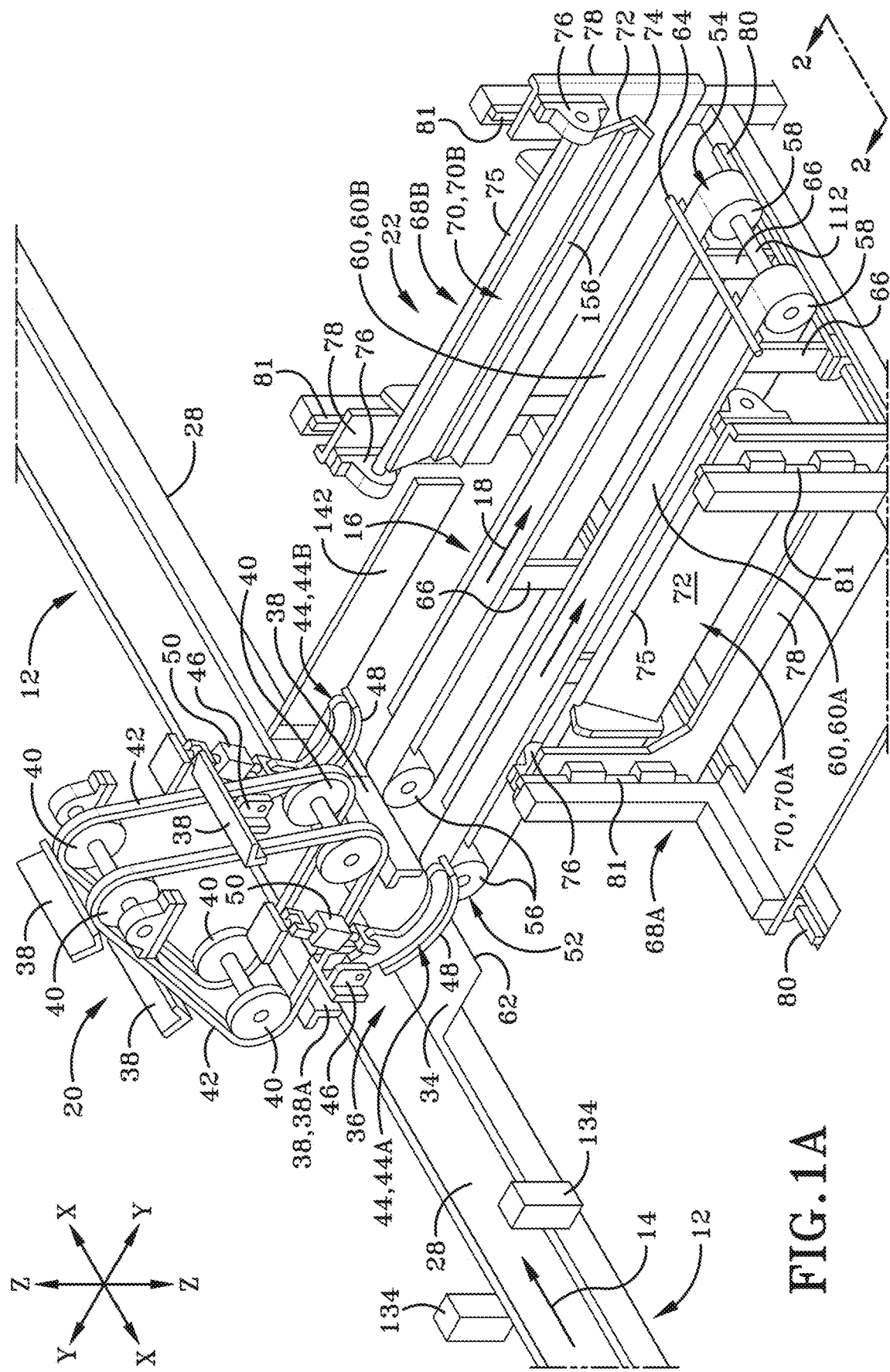
FIG. 1A is an enlarged isometric view of a first conveyor, a diverter, a second conveyor, and an accumulator shown in the region labeled "SEE FIG. 1A" in FIG. 1.

A system or assembly for handling objects is shown generally throughout the figures at 10 (the system or assembly will generally be referred to as assembly 10). Assembly 10 is a machine that operates in three dimensional space, and as such components of assembly 10 may be referenced with respect to cartesian coordinates defined by longitudinal direction X, transverse direction Y, and vertical direction Z. Furthermore, assembly 10 may include any structure components, such as a frame, to support the components detailed herein. The frame that supports the components discussed herein may be either a singular frame such that assembly 10 is a singular structure or a plurality of frames that support respective components that allow the components to be installed or deployed adjacent each other in the manner described herein. Further, assembly 10 may include any number of electrical motors, pneumatics, hydraulics, or the like to effectuate the various movement of the components of assembly 10.

Assembly 10 includes a first conveyor 12 that defines a first path of travel 14 for objects to move along the first conveyor 12. Stated otherwise, the first conveyor 12 conveys objects along the first path of travel 14. A second conveyor 16 defines a second path of travel 18. At least some of the objects are transferred or diverted from the first path of travel 14 on the first conveyor 12 to the second path of travel 18 on the second conveyor 16. The second path of travel 18 is different than the first path of travel 14. The second conveyor 16 conveys at least some of the objects along the second path of travel 18. In one embodiment, the first path of travel 14 is orthogonal to the second path of travel 18. For example, the first conveyor 12 may be oriented parallel to the longitudinal direction X and the second conveyor 16 may be oriented parallel to the transverse direction Y. however, it is possible for the assembly 10 to operate in a configuration where the first path of travel 14 is not orthogonal to the second path of travel 18. For example, the length of the second conveyor 16 may be oriented at an angle that is between 5° and 85° relative to the first conveyor 12.

Assembly 10 may also include a diverter 20. Diverter 20 is an assembly or mechanism to divert at least some of the objects from the first conveyor 12 moving along the first path of travel 14 to the second conveyor 16 to move along the second path of travel 18. An accumulator 22 is in operative communication with the second conveyor 16. The accumulator 22 accumulates objects that were diverted by the diverter 20 from the first conveyor 12 to the second conveyor 16. The accumulator 22 accumulates objects until a selected amount of objects are accumulated.

A lift assembly 24 is in operative communication with the accumulator 22. The lift assembly 24 is configured to lift the selected amount of objects that were accumulated in the accumulator 22. The lift assembly 24 moves between a first position and a second position. When the lift assembly 24 is in the first position, the lift assembly lifts the selected amount of objects and retains the selected amount of objects while the lift assembly moves toward the second position. Stated otherwise, the lift assembly operates in at least two axes to lift the selected amount of objects in the vertical direction Z and to move them from the first position to the second position by translating them in the transverse direction Y.

A queuing assembly 100 defines queuing area 26 and is in operative communication with the lift assembly 24. Wherein when the lift assembly 24 moves to the second position to place the selected amount of objects onto queuing assembly 100 in the queuing area 26. Within the queuing area 26, the selected amount of objects that are placed on the queuing assembly 100 define at least one layer (or row) or a first layer of a stack of objects. After placing a first layer (or first row) of the stack of objects, the lift assembly 24 returns the first position to lift another amount of selected objects that were accumulated by the accumulator 22. The lift assembly 24 repeats the placement of the selected objects in the queuing area 26 to construct multiple layers or rows of objects in the stack of objects.

Assembly 10 may be configured to handle objects, such as wood boards or wood staves/planks, traveling along the various paths that need to be stacked and queued for further processing. However, it is envisioned that any type of object that needs to be stacked and queued could be utilized with assembly 10.

FIG. 1 and FIG. 1A depict that first conveyor 12 may include a conveyor belt 28 that wraps around a first end roller 30 and a second and roller 32, wherein the belt 28 is driven by a motor or pneumatic assemblies or hydraulic assemblies to move objects on the belt 28 along the first path of travel 14 in the longitudinal direction X from the first end roller 30 towards the second end roller 32. There may be other components as one having ordinary skill in the art would recognize to effectuate the operation of a conveyor belt assembly of the first conveyor 12 such as a frame, bearings, mechanical connectors, amongst other components to impart linear movement of the belt 28 to carry objects along the path of travel 14. Although the system depicts belt 28 as part of the first conveyor 12, it is possible for the first conveyor to be beltless. For example, other conveyor types could be utilized that allow objects to move along the first path of travel, such as linear rollers extending in the transverse direction Y that rotate to allow objects to move along the path of travel 14 in the longitudinal direction X.

There is a transfer plate 34 located between the first end roller 30 and the second end roller 32 that is positioned on one side of the belt 28. The transfer plate 34 is useful to effectuate the transition of the objects being diverted from the first path of travel 14 atop the conveyor belt 28 to the second conveyor 16 by diverter 20. Accordingly, the transfer plate 34 is located at a diversion region 36, wherein the diversion region is between first and second ends of belt 28. The transfer plate 34 is located beneath the diverter 20. Stated otherwise, the diverter 20 is at a higher elevation relative to the vertical direction Z than the transfer plate 34. In one particular embodiment, the transfer plate is directly vertically below the diverter 20.

With continued reference to FIG. 1 and FIG. 1A, the diverter 20 may be a subassembly or subsystem of assembly 10 that is configured to divert at least some of the objects moving along the first path of travel 14 to the second path of travel 18. In one particular embodiment, diverter 20 is located in the diversion region 36 above the transfer plate 34 and closely adjacent and vertically above the conveyor belt 28. Relative to the manufacturing order of operations, the diverter 20 is operationally between the first conveyor 12 and the second conveyor 16, operationally upstream from the accumulator 22, operationally upstream from lift assembly 24, and operationally upstream from the queuing assembly 100.

In one embodiment, the diverter 20 utilizes diversion plates 38 to divert the objects from the first conveyor 12. The diversion plates may be structurally rigid members having major surfaces that extend parallel to the longitudinal direction X and parallel to the path of travel 14. Diversion plates 38 may be on a rotating assembly that is part of the diverter 20.

In one particular embodiment, the diverter 20 includes at least three rollers arranged in a generally triangular configuration, wherein the rollers 40 each respectively rotate about an axis that is parallel to the longitudinal direction X. One or more belts 42 may be in operative communication with and wound around the rollers 40. The diversion plates 38 are coupled to the belt or belts 42 to travel around the rollers 40. In the shown embodiment, a lower most diversion plate 38A is positioned such that its length is parallel to the longitudinal direction X but will move in the transverse direction Y to divert objects from the first conveyor 12 moving along the first path of travel 14 to the transfer plate 34 and ultimately to the second conveyor 16 as the lower plate 38A translates in the transverse direction Y in response to movement of belts 42. The total number of diversion plates 38 shall be selected based on the application specific needs of the system and the speed at which objects travel along the first path of travel 14 along the first conveyor 12. For example, if the objects are moving faster along the first conveyor, then more diversion plates 38 maybe necessary to rapidly divert the objects from the first conveyor 12 to the second conveyor 16. In the shown embodiment, there are five diversion plates 38, however, a greater or fewer number of plates 38 may be utilized. Diverter 20 may further include additional structural components, such as a frame or a subframe assembly to mount the diverter 20 in a manner to effectuate the diversion of objects from the first conveyor 12 to the second conveyor 16.

The diverter 20 may also include at least one hold-down mechanism that is pivotally coupled to the frame of the diverter 20. In the show and embodiment there are two hold-down mechanisms 44A, 44B. Each hold down mechanism 44 is pivotally coupled to a bracket or flange 46 to pivot about an axis that is parallel to the longitudinal direction X. In one exemplary embodiment, each hold-down member 44 may be a curved member extending between first and second ends, wherein the first end is pivotally coupled to the flange 46 and the second end is a free terminal end. As such, the each hold-down mechanism may be cantilevered relative to the flange 46 (i.e., which may generally be referred to as bracket 46) to which the respective hold-down mechanism 44 is pivotally connected. While each hold-down member 44A, 44B is shown as being curved between its first and second ends is entirely possible for the hold-down mechanism 44 to have a different structural configuration. Additionally, the hold-down mechanisms 44A, 44B may have a foot member flange or foot flange 48 that is shaped such that a flat surface of the foot flange 48 will engage the objects that are being diverted from the first conveyor 12 to the second conveyor 16. The hold-down mechanisms 44 may also be coupled with a suspension system or suspension assembly 50 comprising a strut that biases the hold-down mechanisms 44 downwardly in the vertical direction Z to ensure that the objects are properly retained against the transfer plate 34 and ultimately to the second conveyor 16. The suspension assembly 50 and its strut may be any type of actuator that responsively biases the hold-down mechanisms 44A, 44B downwardly in the vertical direction Z in a pivoting manner relative to flange 46.

The spacing dimension between the hold-down mechanisms 44A, 44B is greater than the longitudinal length of the diversion plates 38. As such, diversion plates 38 are configured to move in a transverse direction Y between the hold-down mechanisms 44A, 44B. The spacing dimension between the hold-down mechanisms 44A, 44B is less than the longitudinal length of the transfer plate 34.

With continued reference to diverter 20, while the shown embodiment details the use of two belts 42 that are wound around the rollers 40 in a triangular configuration, it is entirely possible for a single belt 42 to be utilized that winds around a plurality of rollers in an alternative configuration. For example, four rollers maybe utilized having a square shape configuration with a single belt such that a lower diversion plate 38A moves transversely in the transverse direction Y relative to the first path of travel 14. As such, the path along which the diversion plates 38 move maybe any shape so long as the lower most diversion plate 38A moves linearly in the transverse direction Y to divert objects moving along the first path of travel 14 from the first conveyor 12 to the transfer plate 34 and ultimately on to the second conveyor 16. As such, the diverter may have a more simple configuration of utilizing only two end rollers similar to a traditional conveyor belt such that the lower most diversion plate 38A moves linearly in the transverse direction Y.

With continued reference to FIG. 1 and FIG. 1A, and relative to the manufacturing order of operations, the second conveyor 16 is operationally downstream or subsequent to the first conveyor 12 and diverter 20, operationally upstream from the accumulator 22, operationally upstream from lift assembly 24, and operationally upstream from the queuing assembly 100. The second conveyor 16 includes a first end 52 and a second end 54 that define the second path of travel 18 therebetween, wherein the second path of travel 18 is aligned in the transverse direction Y. The first end 52 may be defined by one or more rollers 56 and the second end 54 may be defined by one or more rollers 58. At least one belt 60 is wound around the rollers 56, 58 and is configured to move the objects that have been diverted by diverter 20 along the second path of travel 18. In the shown embodiment, there are two belts, namely a first belt 60A and a second belt 60B. However, it is entirely possible to utilize a single belt 60 extending around at least one roller 56 at the first end 52 and at least one roller 58 at the second end 54. As one having ordinary skill in the art would understand, the belt 60 or belts 60A, 60B are driven by motors or pneumatic assemblies or hydraulic assemblies to effectuate rotational-to-linear movement. In another embodiment, second conveyor 16 may be beltless and be defined by a plurality of rollers aligned in the longitudinal direction to allow objects to roller overtop of the rollers in the transverse direction Y.

The first end 52 of the second conveyor 16 is closely adjacent a terminal edge 62 on transfer plate 34 to allow objects being diverted over the transfer plate 34 to move over the top of the transfer plate 34 and onto the belt 60 or belts 60A, 60B. In the shown embodiment, the belt 60 has a width measured between first and second sides, wherein the width dimension of the belt 60 is parallel to the longitudinal direction X. The width dimension of belt 60 is less than or narrower than the spacing distance between the hold-down mechanisms 44A, 44B. Further, the width dimension of the belt 60 is less than the length of the objects being diverted from first conveyor 12 to second conveyor which causes the objects to overhang the sides of the belt 60 or belts 60A, 60B.

A retention bar 64 is positioned adjacent the second end 54 of the conveyor belt 60 on the second conveyor 16. The retention bar 64 may have length that is oriented parallel to the longitudinal direction X and be disposed vertically above the uppermost surface of belt 60. In one embodiment, when there are two belts 60A, 60B, the retention bar 64 is connected to a conveyor support plate 66. The conveyor support plate 66 is coupled with a conveyor frame or subframe assembly that is slidable or moveable on a carriage or trolley in operative communication with track 80 such that the second conveyor 16 is moveable along the track 80 in a direction parallel to the longitudinal direction X. As such the second conveyor 16 may be selectively set to a desired width that corresponds to an appropriate length of the selected amount of objects to be retained by the retention bar 64 and ultimately accumulated by the accumulator 22. In one particular embodiment, the length of the retention bar 64 is longer than the width of the belt 60. The retention bar 64, as will be described greater detail herein, is utilized to retain objects to prevent them from falling off or over the second end 54 of the belt 60. As such, the retention bar 64 is in operative communication with the accumulator 22 in order for the retention bar and/or conveyor support plate 66 to retain the objects in a desired position so that the accumulator 22 may properly accumulate the objects that were diverted until a selected amount of objects are accumulated. The retention bar 64 may take on any structural configuration that effectuates active retention of the objects on the second conveyor 16 above the belt 60. The shown embodiment details the retention bar 64 has being a cylindrical member with a circular cross-section, however other cross-sectional configurations are entirely possible.

With continued reference to FIG. 1 and FIG. 1A, the accumulator 22 is located adjacent the second end 54 of the second conveyor 16. Accumulator 22 includes a first portion 68A and a second portion 68B, wherein the first portion 68A is located along the first side of belt 60A and the second portion 68B is along a second side of belt 60B. As such, the second conveyor 16 defining the second path of travel 18 is located between the first portion 68A and the second portion 68B of accumulator 22 adjacent the second end 54 of the second conveyor 16. The first and second portion 68A, 68B of accumulator 22 is in operative communication with the second conveyor 16 to accumulate objects that were diverted and retained by the retention bar 64 until a selected amount of objects are retained. The accumulator 22 may accumulate the objects for subsequent lifting by the lift assembly 24. The accumulator 22 may have a frame or any subframe to effectuate the mounting of its components in a manner that is an operative communication with the second conveyor 16 to accumulate the selected amount of objects.

Accumulator 22 may comprise two elongated rigid members that are L-shaped and cross-section. These L-shaped members have an upper first leg 72 and a lower second leg 74. The upper first leg 72 is orthogonal lower second leg 74. There may be a rod 75 coupled to the top of each upper leg 72. The length of the elongated L-shape member 70A, 70B is oriented in the transverse direction Y and extends between flanges 76 via rod 75 that defines pivot axis 114A, 114B for the L-shaped members 70A, 70B, respectively. The pivot axis 114A, 114B about which the L-shaped members 70A, 70B respectively rotate or pivot are parallel to the transverse direction Y. The pivoting action of the L-shaped members may be accomplished through an electrical drive motor or pneumatic assemblies or hydraulic assemblies coupled to the L-shaped member 70A, 70B. In one embodiment, only a single motor or single pneumatic/hydraulic assembly is utilized to pivot the L-shaped members 70A, 70B. In other embodiments, two or more motors or multiple pneumatic/hydraulic assemblies may be used to independently pivot the L-shape member 70A, 70B. Each flange 76 is mounted on a respective riser member 78 that is configured to move vertically between a lowered position and a raised position. Thus, there is at least one riser 78 on the first portion 68A and at least one riser 78 on the second portion 68B. This allows the L-shaped members 70A, 70B to be respectively raised and lowered on each side of the second conveyor 60 as will be described in greater detail herein. The manner in which each riser member 78 is raised and lowered may be accomplished in a variety of different ways and is not intended to be limited to that which is shown. In the shown example, the riser member 78 is in operative communication with vertically aligned posts which may have tracks 81 thereon that allow the riser to slide in the vertical directions Z upward and downward. L-shape members 70A, 70B, due to their fixed connection with flanges 76 also move upward and downward in response to movement of each riser member 78, respectively. The motor or pneumatics that effectuates the vertical movement of the riser member to raise or lower the L-shaped member 70A, 70B may be the same motor or pneumatics that effectuates the pivoting action or maybe a different independent motor or different pneumatic assembly.

With continue reference to the accumulator 22, the first portion 68A may be installed on a horizontal track 80 to allow the spacing distance between the first L-shaped member 70A and the second L-shaped member 70B to be varied by moving the first portion 68A along the track 80 parallel to the longitudinal direction X. By moving the first portion 68A along the track 80 and parallel to the longitudinal direction X, the accumulator 22 is able to vary the width or spacing distance between the L-shape members 70A, 70B to accommodate various sizes of objects to be accumulated atop the second conveyor 16. Thus, at least a portion of the accumulator 22, such as the first portion 68A, is associated with at least two axis movement, wherein the two axis movement refers to linear translation in the longitudinal direction X and vertical translation in the direction Z. Additionally, it has a pivoting movement about a pivot axis 114A for the L-shaped member 70A to pivot about. The second portion 68B of the accumulator 22 is associated with vertical movement in the direction Y and pivoting or rotational movement about a pivot axis 114B for the second L-shaped member 70B.

Figure 1B:
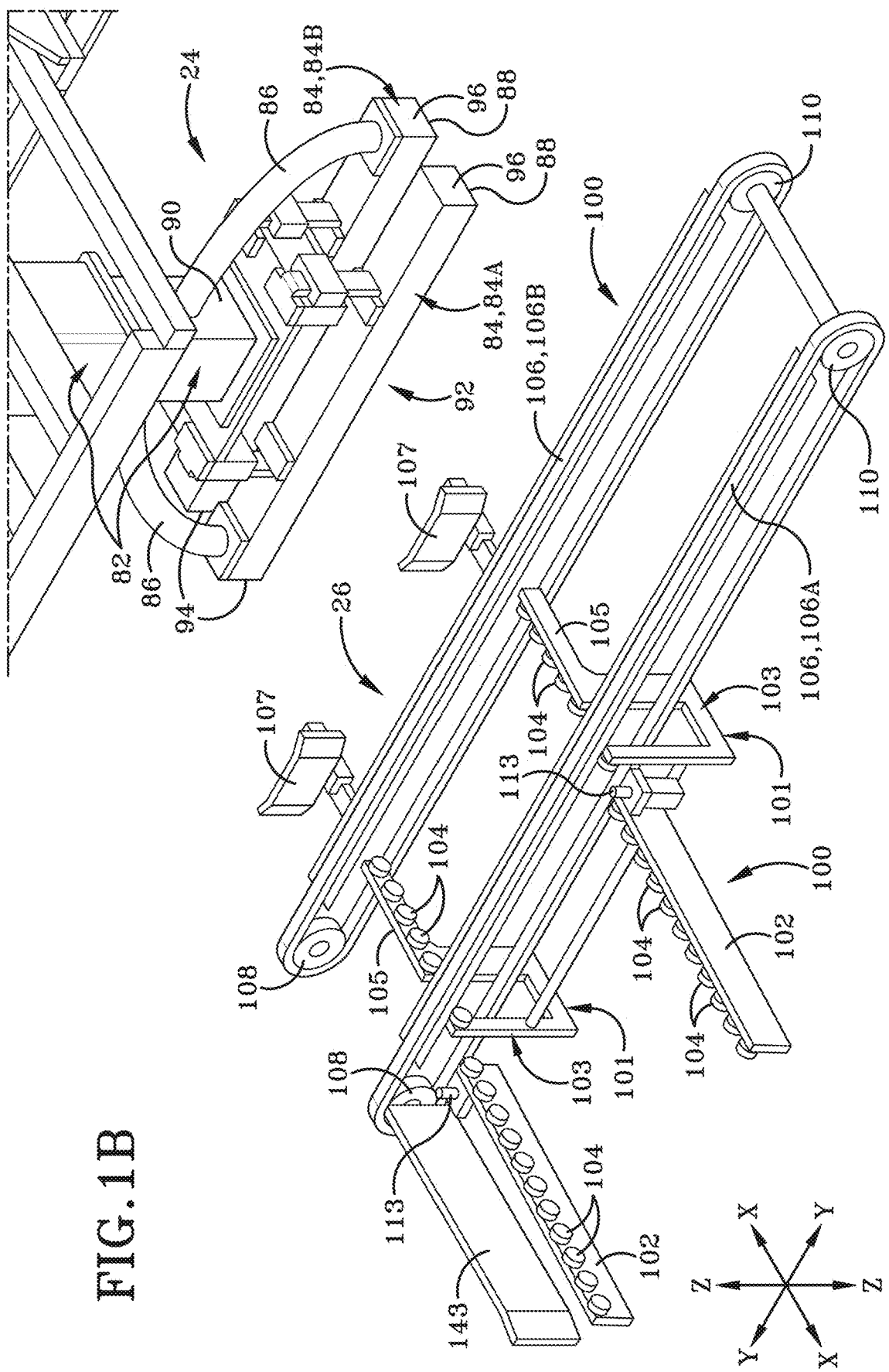
FIG. 1B is an enlarged isometric view of a queuing assembly and a lift assembly shown in the region labeled "SEE FIG. 1B" in FIG. 1.

FIG. 1 and FIG. 1B depict the lift assembly 24 and the queuing assembly 100 that defines the queuing area 26. Lift assembly 24 includes an overhead frame from which a telescoping member 82 is suspended. The telescoping member 82 allows portions of the lift assembly 24 to move vertically in the vertical direction Z. Lift assembly 24 includes at least one vacuum plate 84. In the shown example, there are two vacuum plates 84A, 84B. Vacuum plates 84 each have a lower surface that may be perforated with holes to apply a vacuum force or suction force via hoses 86 that are in operative communication with the holes in the lower surface 88. A vacuum source is in operative communication with the holes in the lower surface 88 of the vacuum plates 84 via hoses as one having ordinary skill in the art would understand. Thus, the portions of the lift assembly 24 that are coupled to the lower end 90 of the telescoping member 82 may be considered to be a vacuum head assembly 92. The head vacuum head assembly 92 is composed of the least one vacuum plate 84 and other structural components to effectuate the lifting of objects that were accumulated by the accumulator 22. The telescoping member 82 is also movable in the transverse direction Y between the first position and the second position. This allows the vacuum head assembly 92 to move between the first position and second position such that assembly 92 may lift the accumulated objects from the accumulator 22 and move them to the queuing area 26 onto assembly 100.

In one particular embodiment, each of the vacuum plates 84A, 84B has a first end 94 and a second end 96. The vacuum plate maybe elongated between the first end 94 and the second end 96, wherein the length of the vacuum plate 84A, 84B is the maximum dimension and is parallel to the transverse direction Y. In one particular embodiment, the length of the vacuum plates 84A, 84B is greater than the associated dimension of objects accumulated by the accumulator 22. This ensures that all of the objects that are accumulated by the accumulator 22 are successfully lifted from above by the vacuum suctioning forces imparted by the vacuum plates 84A, 84B in the vacuum head assembly 92 and may be lifted in the vertical direction by operational movement of the telescoping member 82 and then moved in the transverse direction Y between the first position and the second position into the queuing area 26.

While two vacuum plates 84A, 84B are shown, it is entirely possible to utilize a single vacuum plate or more than two vacuum plates to effectuate the lifting and movement of the selected amount of objects that were accumulated in the accumulator 22 between the first position and the second position. Notably, the first position of the lift assembly 24 is associated with the telescoping member 82 and the vacuum head assembly 92 being positioned above the accumulator 22 and the second position of the lift assembly 24 is associated with the telescoping member 82 carrying the vacuum head assembly 92 being vertically above the queuing area 26. The motors or pneumatics that cause the lift assembly 24 to translate or move in the transverse direction Y maybe any number of motors or pneumatic assemblies comprising various rollers or the like to cause a frame carrying the telescoping member 82 to roll overhead similar to that of an overhead crane.

The queuing assembly 100 is located in the queuing area 26. The queuing assembly 100 maybe any structural configuration to retain the selected amount of objects there on or therein until a stack of objects (formed from multiple layers of objects) has been created for later transport for further downstream operations or processing. In one example, the queuing assembly 100 includes a longitudinally aligned frame 102 comprising a plurality of rollers 104 to effectuate movement of a pallet or other similar structure in the longitudinal direction X. Assembly 100 also includes a lift frame 101 that is moveable between a lowered position and a raised position. There may be stop pins 113 that can be actuated to permit the movement of pallet from frame 102 onto the lift frame 101. Namely, when the pins 113 are in the raised position, the pallet will not move onto the lift frame 101 as the pins 113 block that movement, but when the pins 113 are down, a pallet may freely move from frame 102 onto lift frame 101. There may be an alignment plate 143 adjacent once side of frame 102 that helps square and align the pallet atop the frame 102 and squared as it slides atop rollers 104 on the lift frame 101 and then retained by stop blocks or stop members 107. The lift frame 101 includes a U-shaped section 103 that fits below a conveyor belt 106, wherein the lift frame 101 moves upward and downward and the conveyor belt 106 remains in space defined by the U-shaped section 103. There may be a straight leg 105 of the lift frame 101 that extends in the longitudinal direction X from the upper portion of the U-shaped section. There are rollers 104 on the lift frame 101. The lifting of lift frame 101 may be accomplished by any number of motors, pneumatic assemblies or hydraulic assemblies or the like to effectuate the movement of lift frame 101 between the lowered position and the raised position. The frame 102 may include stop members 107 that retain a pallet or other similar device in a desired position in the queuing area 26 that is vertically below the second position of the lift assembly 24. Queuing assembly 100 may also include a conveyor belt 106 or a plurality of conveyor belts 106A, 106B that are able to move a pallet or stack of objects in the transverse direction Y. Conveyor belts 106 maybe wound around a first-end roller 108 and a second end roller 110.

Figure 2:
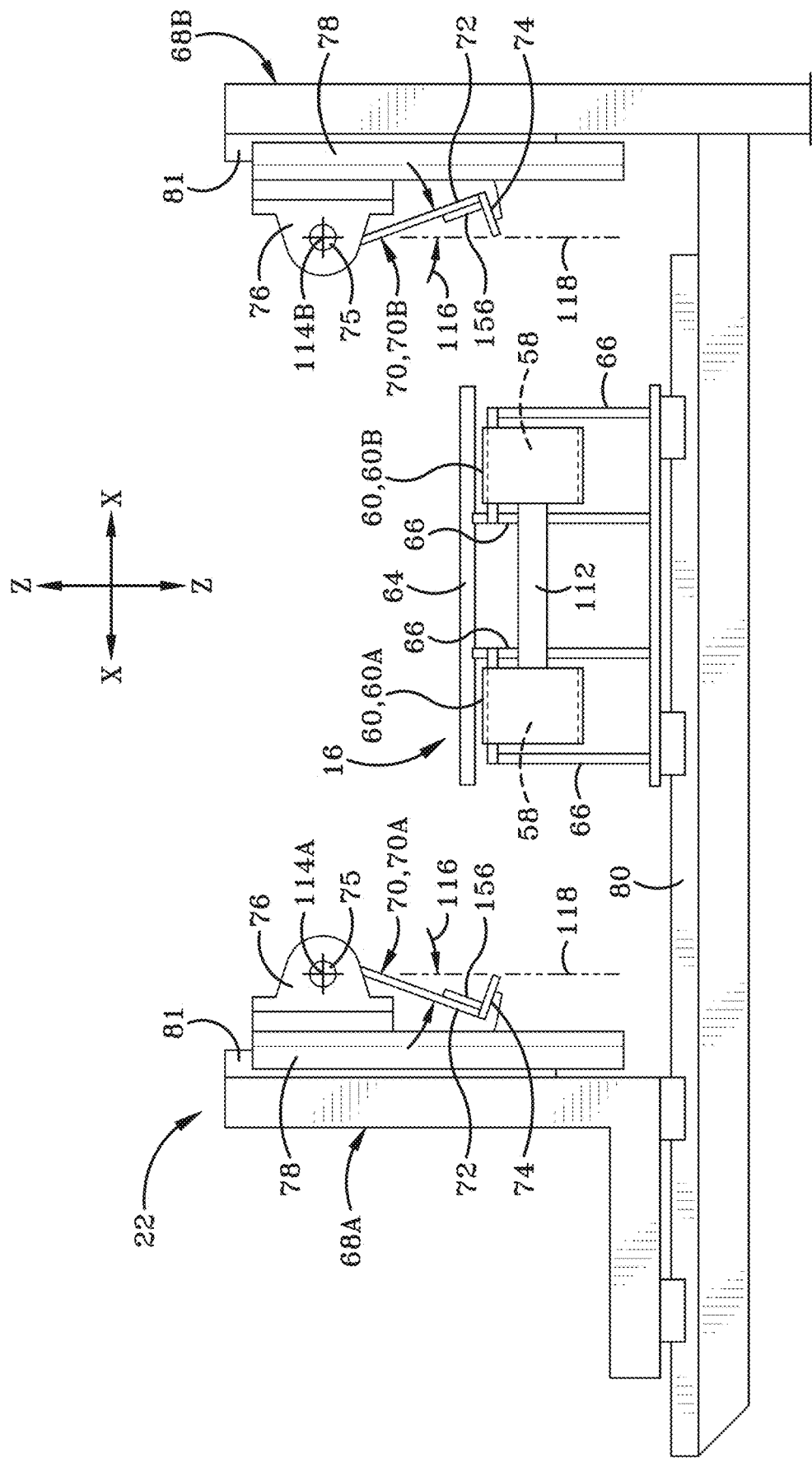
FIG. 2 is an elevation view taken along line 2-2 in FIG. 1A depicting the accumulator and second conveyor.

FIG. 2 depicts an end view of the accumulator 22 and the second conveyor 16. With respect to the second conveyor 16, the rollers 58 at the second end 54 may be connected by an axle 112 extending therebetween that is parallel to the longitudinal direction X. The length of the axle 112 separating rollers 58 may be less than the width of the retention bar 64. The retention bar 64 has a length measured the longitudinal direction X that is greater than the distance between the outer ends of rollers 58. The second conveyor 16 is positioned between the first portion 68A and the second portion 68B of accumulator 22.

The flange 76 coupled to a cylindrical rod 75 on the first L-shaped member 70A defines pivot axis 114A and the flange 76 coupled a cylindrical rod 75 on the second L-shaped member 70B defines a second pivot axis 114B. Pivot axis 114A and pivot axis 114B are parallel to the transverse direction Y (shown into and out of the page in FIG. 2). When each of the riser members 78 are in their lowered position (FIG. 2), the pivot axis 114A and pivot axis 114B are vertically above the second conveyor 66. The upper leg 72 on each L-shaped member 70A, 70B extends downwardly from the flange 76 to an orthogonal connection with the lower leg 74. When the riser flange 78 is in its lowered position (FIG. 2), the lower leg 74 of each respective L-shaped member 70A, 70B is at a vertical height that is less than that of the retention bar 64. As will be described in greater detail below, the L-shape member 70A, 70B are driven to pivot inwardly towards each other to accumulate the selected amount of objects therebetween. Then, the riser member 78 is lifted vertically in the vertical direction Z to a raised position where the lower legs 74 of the L-shape members are lifted to a vertical height greater than that of the second conveyor 16. Each riser 78 is in operative communication with vertical tracks 81.

Figure 5A:
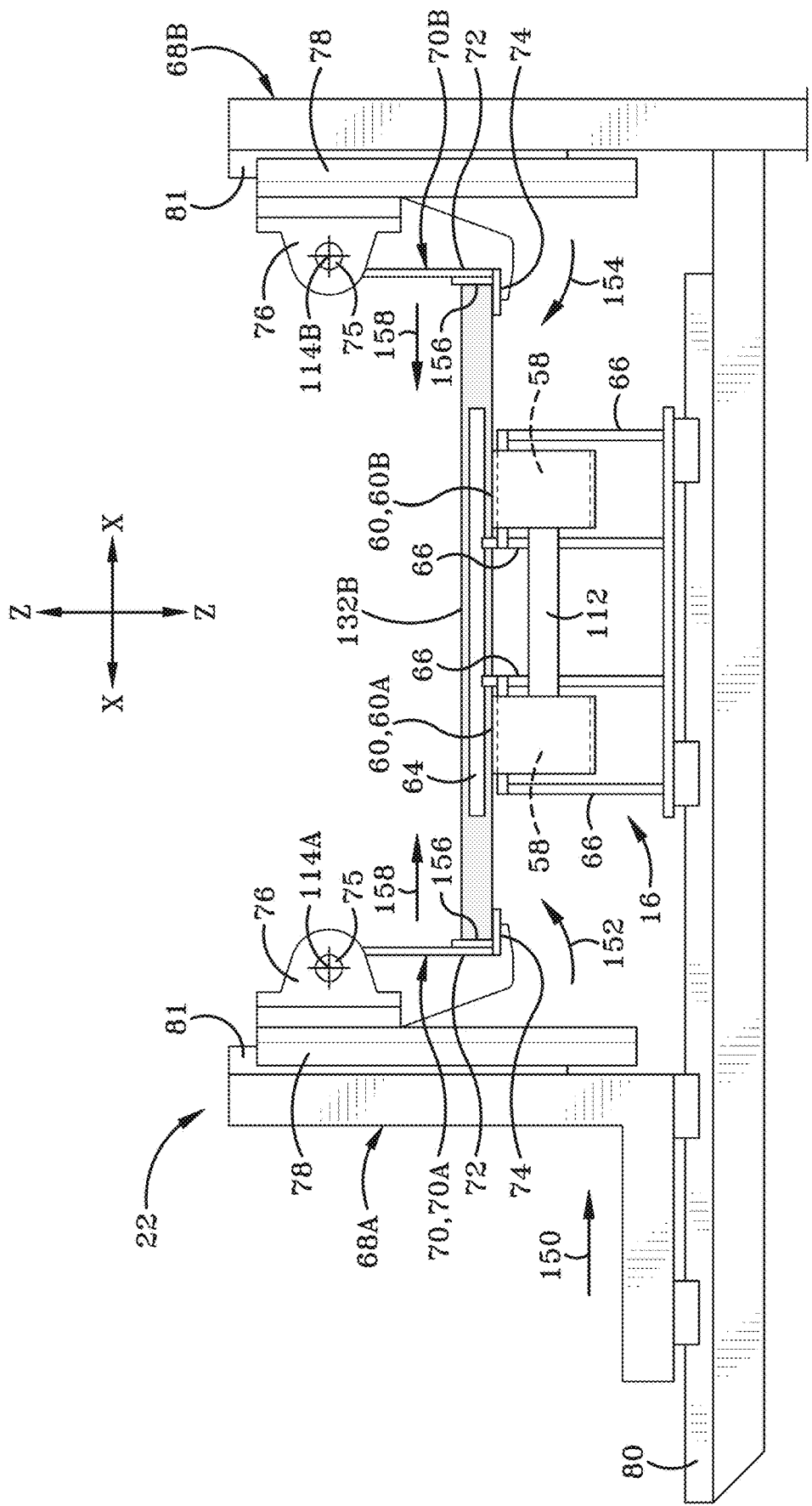
FIG. 5A is an operational end elevation view of the accumulator squaring the objects on the second conveyor.

The L-shaped members 70A, 70B cooperate to move between an open position (FIG. 2) and a closed position (FIG. 5A). When the L-shaped member 70A, 70B are in the open position as shown in FIG. 2, the upper first leg 72 of the L-shaped members 70 is angled and not directly vertical. In one particular embodiment, when the L-shaped members 70 are in the open position, the upper first leg 72 intersects a vertical axis 118 at an angle 116 that ranges from about 5 degrees to about 25 degrees. The angle 116 goes directly vertical or nearly vertical as indicated by vertical axis 118 when the L-shaped member 70 pivot from their open position to their closed position.

Further, FIG. 2 depicts the first portion 68A of accumulator 22 in its widened position. As will be described greater detail below the first portion 68A will move to a narrowed position by sliding frame members or a subframe assembly of the first portion 68A in the longitudinal direction X along a track 80. Moving the first portion 68A towards the second portion 68B causes the L-shaped members 70A, 70B to come closer together and narrow the spacing distance between them in order to accumulate the selected amount of objects between the L-shaped members 70A, 70B.

With continued reference to FIG. 2, second conveyor 16 is able to slide in the longitudinal direction X along track 80. The conveyor support 66 is in operative communication with a carriage that slides or is otherwise movable on track 80. The movement of the second conveyor 16 is configured to allow the conveyor belts 60 to be centered below the objects that are supported thereon. Additionally, the sliding movement or other movement of the second conveyor 16 in the longitudinal direction X may be accomplished via an electric motor, pneumatics, or hydraulic assembly. The movement of the second conveyor 16 in the longitudinal direction X may occur either before or after the movement of the first portion 68A of the accumulator 22 depending on the application specific needs of assembly 10. However, it is envisioned that one particular embodiment moves the second conveyor 16 to a desired centered position relative to the objects such that the second conveyor 16 is center below the lift assembly 24 prior to the operation of assembly 10.

Having thus described the exemplary structural components of the assembly 10 for handling objects, reference will now be made to the operation of assembly 10 with respect to constructing a stack of objects.

FIG. 3A depicts that a pallet or other platform 120 is placed atop the rollers 104 on frame 102 of the queuing assembly 100 the pallet 120 is then moved in the longitudinal direction X as indicated by arrow 122. Pallet 120 is moved over atop the lift frame 101. Lift frame 101 is then elevated from its lowered position to its raised position as indicated by arrow 109. The lifting of the lift frame 101 in the vertical position causes the U-shaped section of lift frame 101 to straddle both sides of the first conveyor belt 106A. The lift assembly 101 and the U-shaped section causes the pallet 120 to pass over the first conveyor belt 106A. When the pallet is able to move over the first conveyor belt 106A, the pallet may be continued to move in the direction of arrow 122 until the pallet contacts the stop members 107 above the first and second conveyor belts 106a, 106b. The pallet 120 is then considered to be in the queuing area 26 in order to receive the objects thereon to create a stack of objects.

With continued reference to FIG. 3A, when the pallet 120 is loaded on the frame 102, the length of the pallet, which is measured in the transverse direction Y, is greater than the spacing dimension distance between two members that define frame 102. This allows the pallet 120 to slightly overhang the frames such that respective ends of the pallet 120 are supported by the first member and the second member of frame 102 to enable the pallet 120 to glide or slide along rollers 104. In order to effectuate the sliding movement as indicated by arrow 122, the pins 113 will be lowered from their raised position. Recall, when pins 113 are in their raised position they act as stops or stop blocks to prevent undesired movement of the pallet 120 onto the lift frame 101. However, when the pins are moved or lowered, the pallet 120 is able to freely slide along rollers 104 from the frame 102 onto the lift frame 101. As the pallet slide slides onto the lift frame 101, the first side of the pallet will first pass over the first conveyor 106A and then continue to pass over the second conveyor 106B. Thereafter, the first side of pallet 120 will contact and be retained by the stop members 107. The raising and lowering of pins 113 may be controlled by any portion of the control logic of assembly 10 and effectuated by any type of motor, pneumatics, hydraulics or other device capable of imparting movement to pins 113.

Figure 3B:
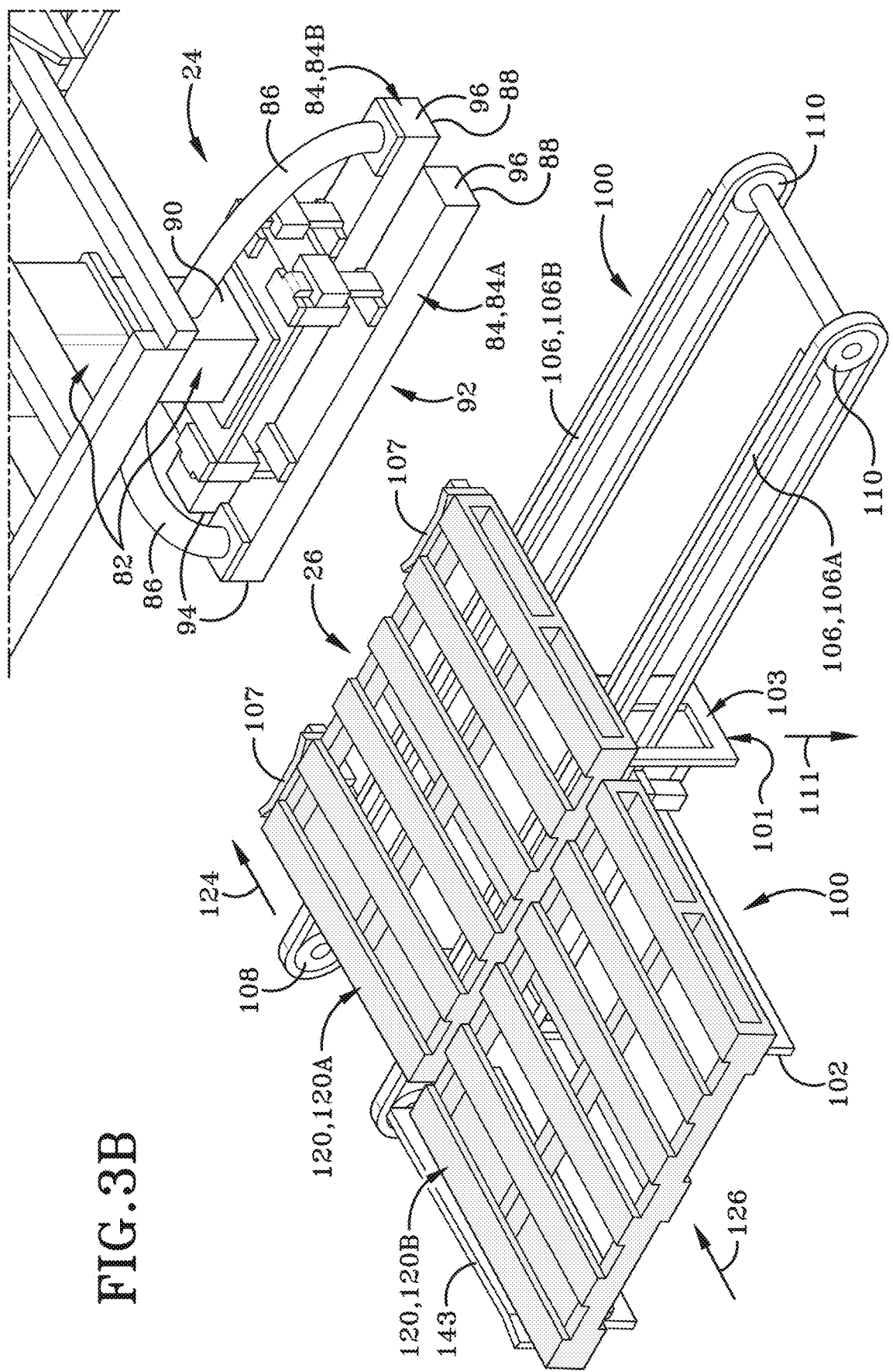
FIG. 3B is an operational view depicting a second pallet being loaded onto the queuing assembly and the first pallet being moved into a position to receive a stack of objects, wherein the components that are primarily referenced with respect to their operational description are shown shaded.

FIG. 3B depicts that the pallet 120 is positioned above the conveyor belt 106 in the queuing assembly 100 and retained by the stop members 107. When the pallet 120 is retained by stop members 107, the lift frame 101 may be lowered from its raised position as indicated by arrow 111. After having been pushed fully in the longitudinal direction as indicated by arrow 124, a second pallet 120B may be loaded onto the frame 102 and supported by rollers 104 as indicated by arrow 126. Thus, the original pallet 120 may then be considered a first pallet 120A. First pallet 120A is the pallet that will receive the objects thereon and the second pallet 120B is a queued pallet waiting to receive objects thereon until the stack of objects has been created on the first pallet 120A. Once the stack of objects has been created on the first pallet 120A, it will be moved out of position down the conveyor belt 106 towards the second end roller 110. The process repeats such that the second queued pallet 120B will then be moved into the position shown in FIG. 3B with respect to the first pallet 120A as will be described in greater detail herein.

With continued reference to FIG. 3B, the pins 113 may be raised back from their lowered position to the raised position after the first pallet 120A engages stop members 107. Then, the lift frame 101 may be lowered as indicated by arrow 111 to retain the lower surface of the first pallet 120 on the conveyors 106A, 106B with the pins 113 in the raised position the second pallet 120B may be loaded onto the frame 102 and slid into a holding position as indicated by arrow 126 and retained by pins 113 such that it remains queued and stationary ready for subsequent loading and processing. The second pallet 120B may be also retained by alignment plate 143 and held in position by pins 113 until the load of the objects on the first pallet 120A is completed. When the first pallet 120A is retained against the stop members and the second pallet 120B is retained against the pins, the first pallet 120A and the second pallet 120B are generally in a side-by-side relationship.

FIG. 3C depicts that prior to moving the telescoping member 82 to its extended lowered position, the vacuum head assembly 92 will lift up a cardboard sheet 128, and more particularly a first cardboard sheet 128A, through vacuum suction forces and place it atop the first pallet 120A. As shown, the vacuum head assembly 92 is shown after it was positioned over a stack of cardboard sheets 128 and lowered to engage the lower surface 88 of the vacuum plates 84A, 84B with a first major surface of a first cardboard sheet 128A. The vacuum is initiated or turned on to create a suctioning effect or suction force through the holes in the lower surface 88 of the vacuum plates 84A, 84B to retain the first sheet of cardboard 128A on the vacuum head assembly 92. Then, the telescoping member 82 is lowered from its collapsed position to its extended and lowered position as indicated by arrow 127. The lowering of telescoping member 82 may be accomplished by any electric motor, pneumatics, hydraulics or other mechanism capable of imparting the telescoping movement to the telescoping member 82 to ultimately raise and lower, repeatedly, the vacuum head assembly 92.

Figure 3D:
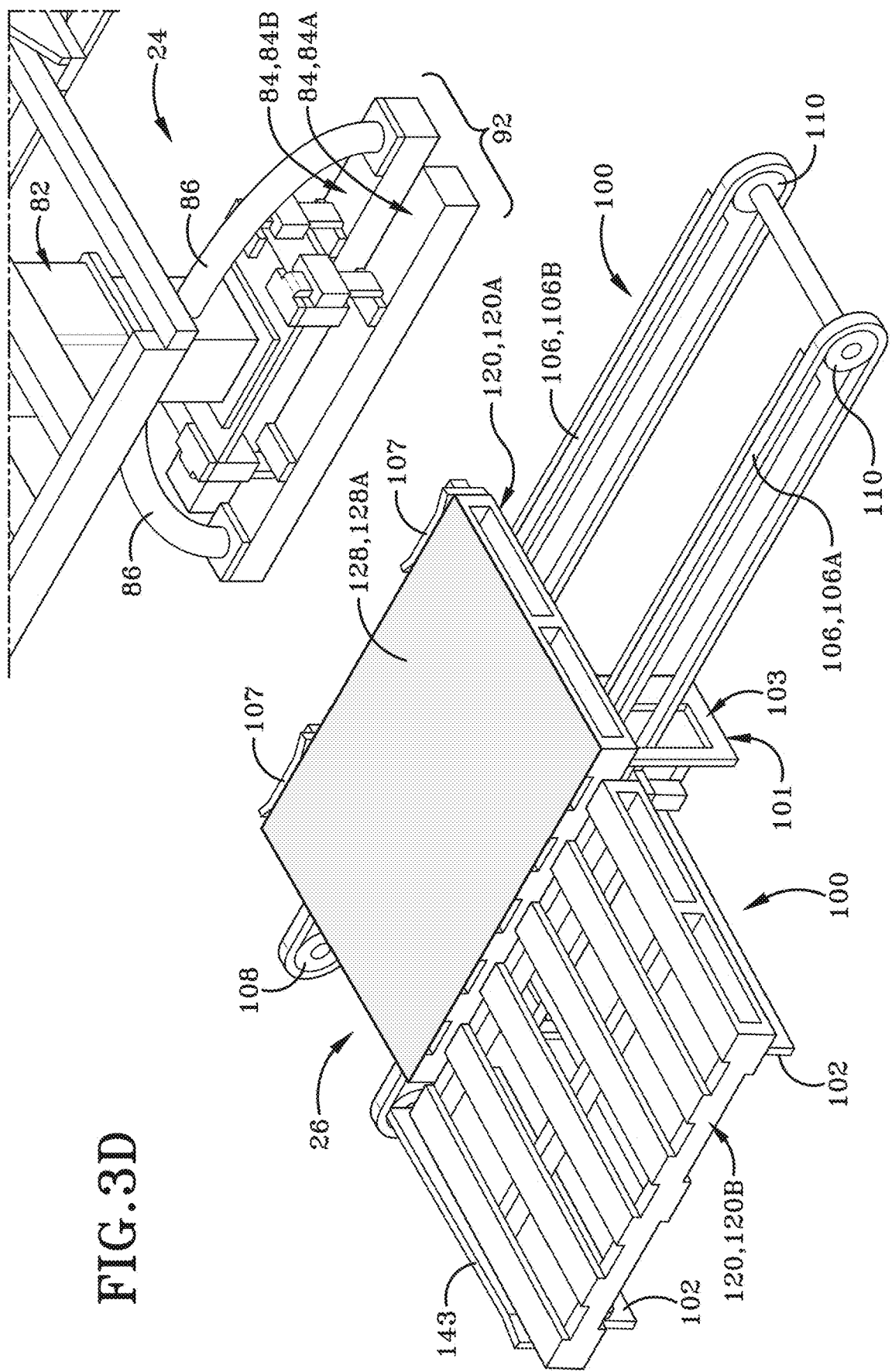
FIG. 3D is an operational view to depicting the first cardboard sheet loaded onto the first pallet and the lift assembly being removed, wherein the components that are primarily referenced with respect to their operational description are shown shaded.

FIG. 3D depicts that the vacuum head assembly will release its vacuum suction force such that the cardboard sheet 128A remains the top the first pallet 120A. After releasing its vacuum suction force from the vacuum head assembly 92, and more particularly the vacuum plates 84A, 84B, the telescoping member will revert to its raised and collapsed position to position the vacuum head assembly at a higher vertical height than the cardboard sheet 128A. The lift assembly 24 may then be moved back to its second position.

After the first cardboard sheet 128A is placed on the pallet 120A, the operation of diverting and handling objects may be initiated. However, it is to be understood that this step is not required to occur subsequent to the placement of sheet 128A and the order of operations may occur in a different order or may occur simultaneous to each other.

In the exemplary embodiments detailed herein, the objects are considered to be wood boards or wooden planks or staves. However it is to be understood that the assembly 10 of the present disclosure can be used with any type of object should not be limited to creating a stack of wood boards but rather a stack of any type of object. For example, the present disclosure could be utilized with metal objects, ceramic objects, polymer objects or the like that need to be sized, sorted, handled, queued, and placed or stacked on a pallet or other platform.

Figure 4A:
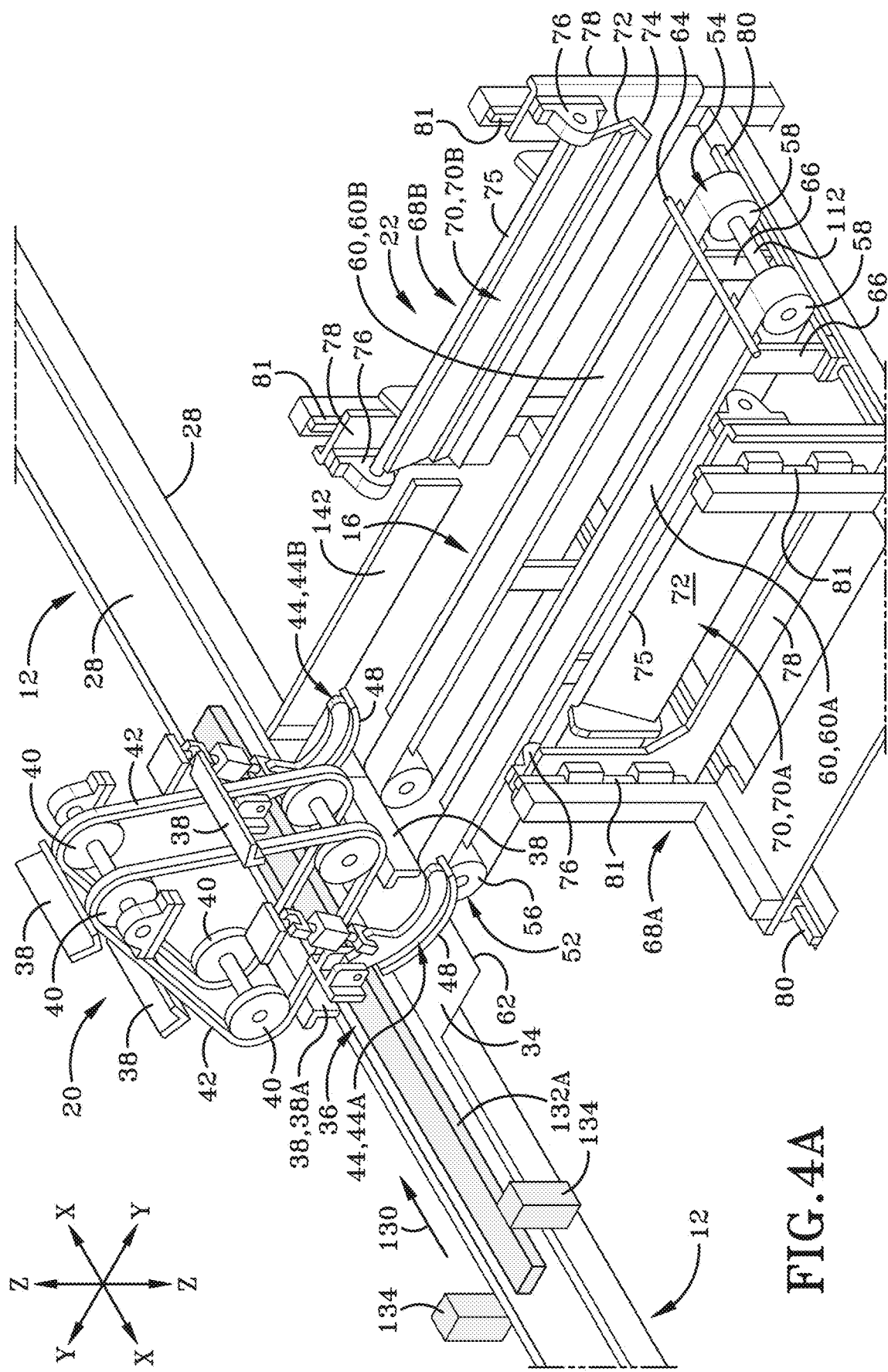
FIG. 4A is an operational view of a first object moving along the first conveyor and the first object being of an insufficient size to be loaded onto the pallet and therefore bypassing the diverter, wherein the components that are primarily referenced with respect to their operational description are shown shaded.

FIG. 4A depicts a first object 132A, which happens represent a wood board or wood stave, but can be any type of object, moving along the first conveyor 12 in path of travel 14 as indicated by arrow 130. It is known that the objects moving along the first conveyor 12 in the first path of travel 14 may have varying lengths which are oriented in the longitudinal direction X. Assembly 10 is configured to divert the objects that have a desired length that they may be accumulated by the accumulator 22 and ultimately stacked into a stack of objects all having the same similar lengths.

FIG. 4A depicts a first object 132A that has a length that is greater than the desired length for creating a stack of objects. More particularly, the length of the first object 132A is greater than the width of the accumulator 22. The length of the object may be sensed by sensors 134. Notably, the sensors 134 need not be located in the shown location. Sensors 134 may be located in any location so long as they are able to determine the length, size, or other desired parameter of the objects. For example, the sensors could even be located on a different machine that is located in the manufacturing facility, such as a cutting assembly that is operationally upstream from assembly 10. The manner in which the sensors 134 determine the length of the object 132 can be accomplished in any known manner. For example, sensors may be high-speed cameras, active sensors, such as laser sensors, passive sensors, near field detection sensors, or any other sensor capable of determining the length of an object passing thereby at an operational rate of speed. In this exemplary embodiment, the sensors 134 determine that the length of the first object 138 is too long and not the desired dimension for the ultimate stack of objects that is to be created or generated by the assembly 10. As such, control logic or a computer program product or software in the assembly 10 will instruct the diverter 20 to remain inactive and allow the first object 132A to continue along the first conveyor 12 to its downstream end where the first object maybe transferred for further processing, be disposed, be recycled, or otherwise be utilized in a different manner for a different purpose.

Figure 4B:
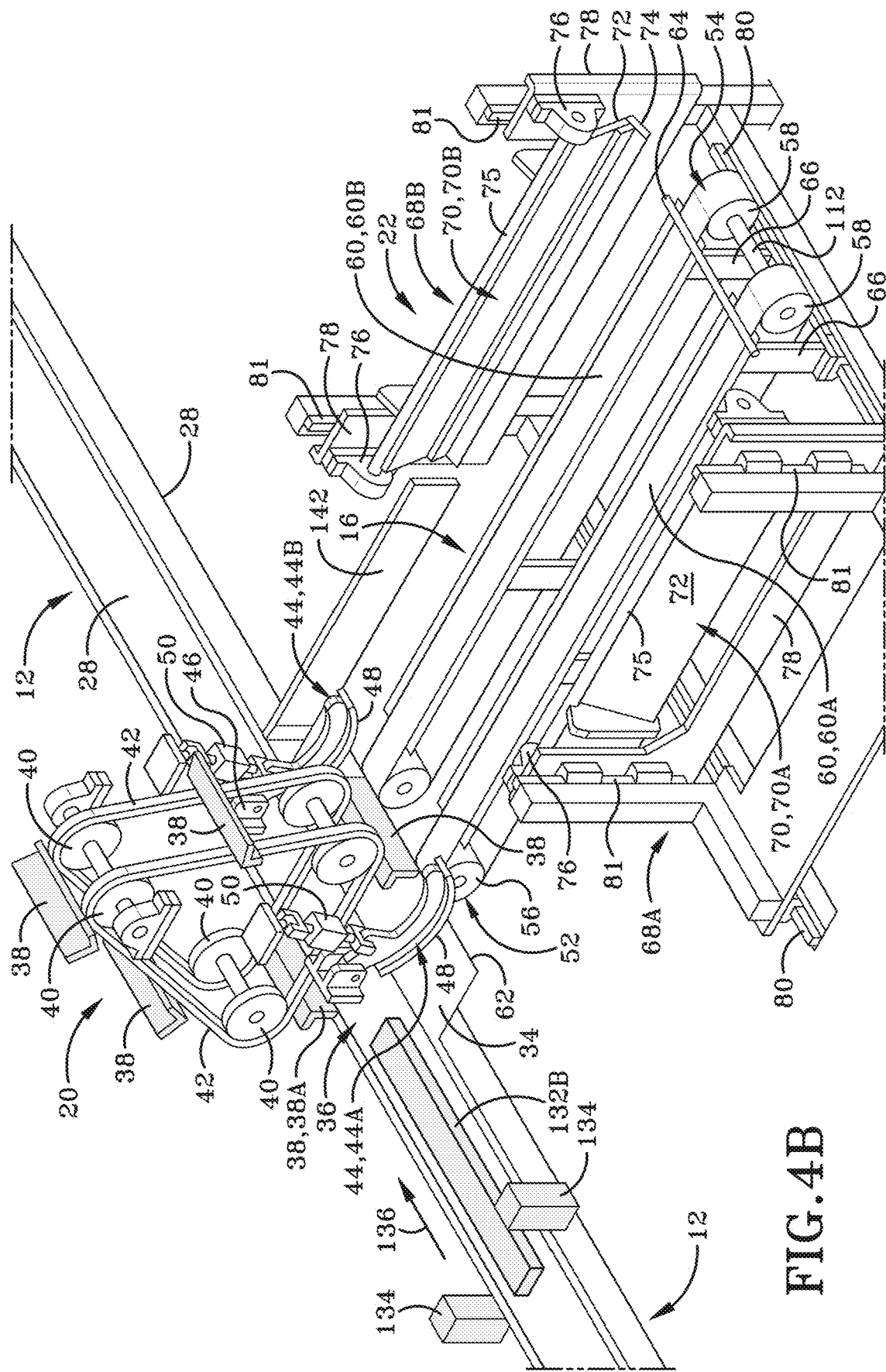
FIG. 4B is an operational view depicting a second object of a sufficient size on the first conveyor and the second object is approaching the diverter, wherein the components that are primarily referenced with respect to their operational description are shown shaded.

FIG. 4B depicts the operation of a second object 132B traveling along the first conveyor 12 in the first path of travel 14. The sensors 134 determine that the second object is of a sufficient or desired length and needs to be stacked in a stack of objects. The sensor 134 determines that the length of the second object 132B is the desired length as it moves in the direction of arrow 136. When the sensors determine that the objects 132B is of the desired length, the sensors 134 will either a generate a control signal or send a control signal to the diverter 20 for it to initiate its operation at a proper time so as to divert the second object 132B from the first conveyor 12 to the second conveyor 16 along the second path of travel 18. In FIG. 4B, the second object 132B is approaching the diverter 20 as indicated by arrow 136 and the lower diversion plate 38A is offset to one side of the second object 132B so that it may divert the object across the transfer plate 34 and onto the second conveyor 16 in the second path of travel 18.

Figure 4C:
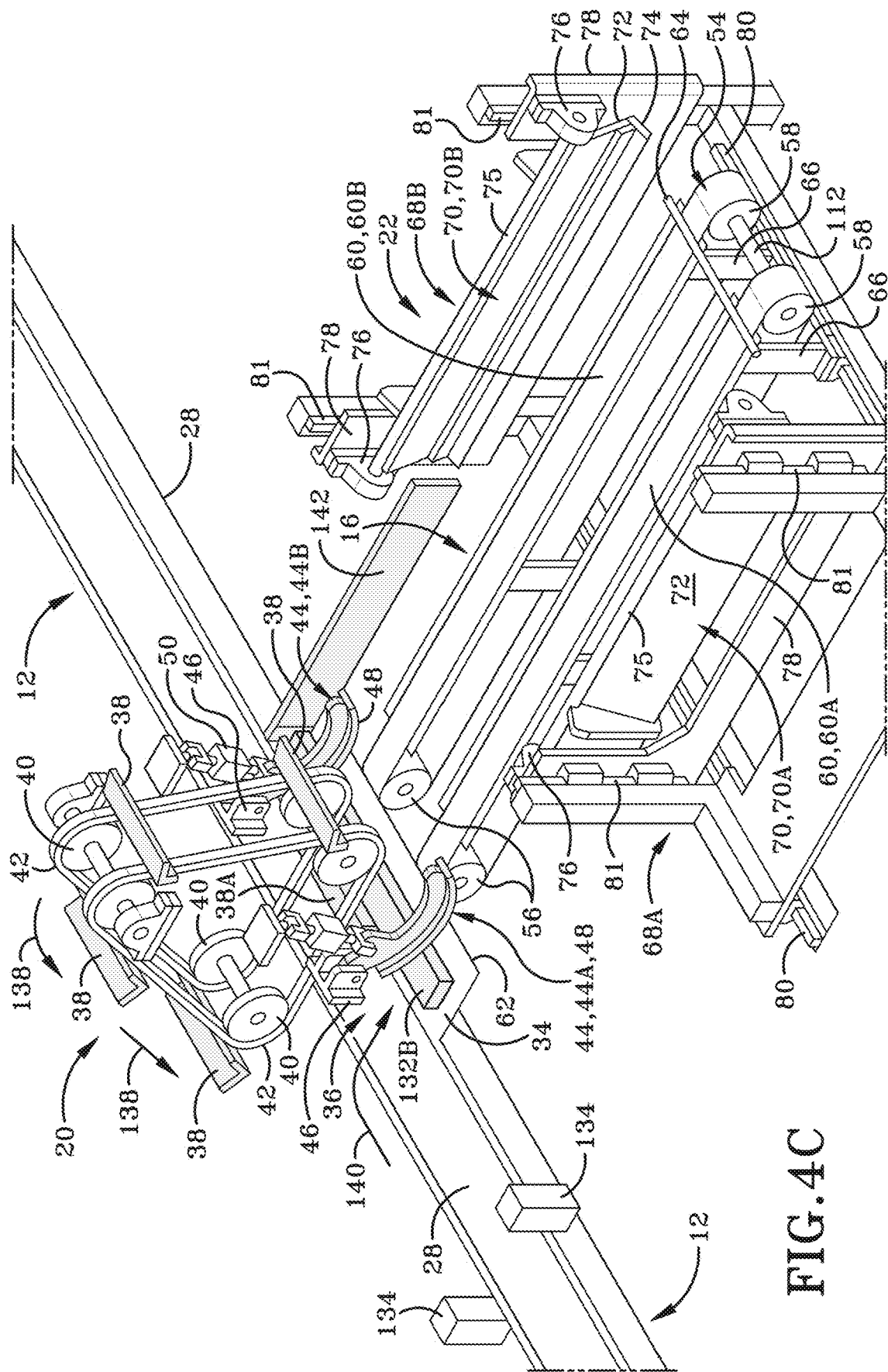
FIG. 4C is an operational view of the diverter diverting the second object onto a transfer plate towards the second conveyor, wherein the components that are primarily referenced with respect to their operational description are shown shaded.

FIG. 4C depicts the operation of diverter 20. Diverter 20 is activated in response to receiving the control signal from sensors 134 to actuate or initiate its motors, pneumatic assemblies, or hydraulic assemblies to drive the diversion plates 38 as indicated by arrows 138. The lowermost diversion plate 38A translates in the transverse direction Y to push the second object 132B onto the transfer plate 34. As such the second object 132B is diverted from the first path of travel 14 to the second path of travel 18 as indicated by arrow 140. The lower diversion plate 38A continues to push the second object 132B in the transverse direction Y over the transfer plate 34. While the lower diversion plate 38A pushes the second object 132, the object 132B is retained by the hold-down mechanism 44. More particularly, the foot flange 48 on each of the respective hold-down mechanisms 44A, 44B contacts the upper surface of the second object 132B. The hold-down mechanisms 44A, 44B pivot and are supported by the suspension assembly 50. More particularly, the suspension assembly provides a downward force to the second object 132B as the hold-down mechanisms 44A, 44B pivot slightly upward via the pivot axis defined by flange 46. When the second object 132B is retained on the transfer plate 34 and pushed in the transverse direction Y towards the second path of travel 18, an end of this second object 132B maybe squared with a retention plate 142. With the end of the second object 132 against the retention plate, the lower diversion plate 38A continues to move the second object 132 towards the second conveyor 16.

Figure 4D:
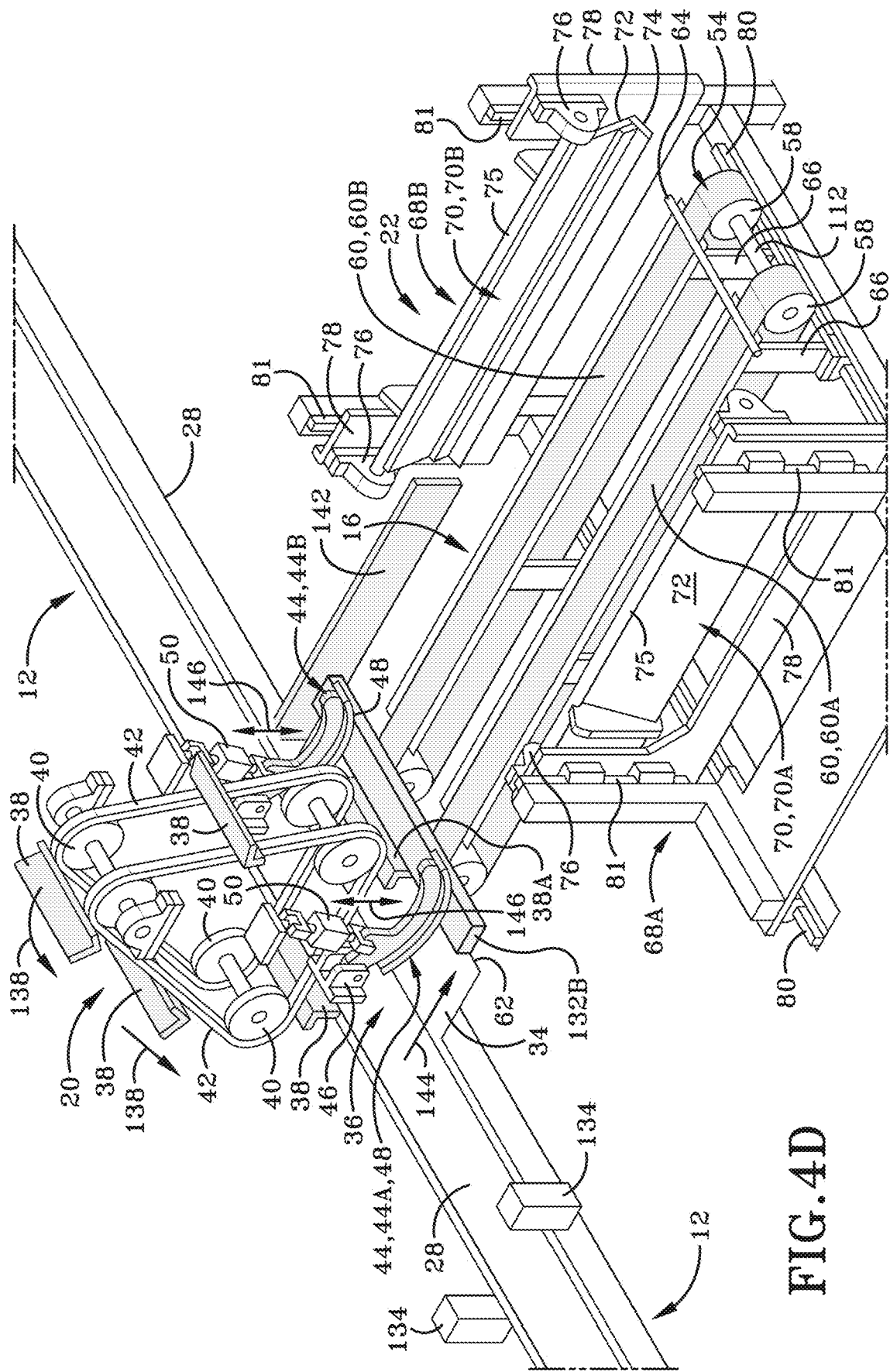
FIG. 4D is an operational view of the diverter diverting the second object from the transfer plate to the second conveyor, wherein the components that are primarily referenced with respect to their operational description are shown shaded.

FIG. 4D indicates that the lower diversion plate 38A continues to move in the transverse direction as indicated by arrow 144 to push the second object 132B off the transfer plate 34. The continued movement of the second object 132B and the transverse direction as indicated by arrow 144 causes the hold-down mechanisms 44A, 44B to pivot about the pivot defined by flange 46 and move upwardly. In response to the upward movement of the hold-down mechanisms 44A, 44B, the strut or suspension assembly 50 applies a downward pressure to ensure that the second object 132B is held down in a proper position as it is pushed onto the conveyor belt 60 of the second conveyor 16. The movement of the hold-down mechanisms 44A, 44B as well as the force imparted by the suspension assembly 50 is indicated by arrows 146.

Figure 4E:
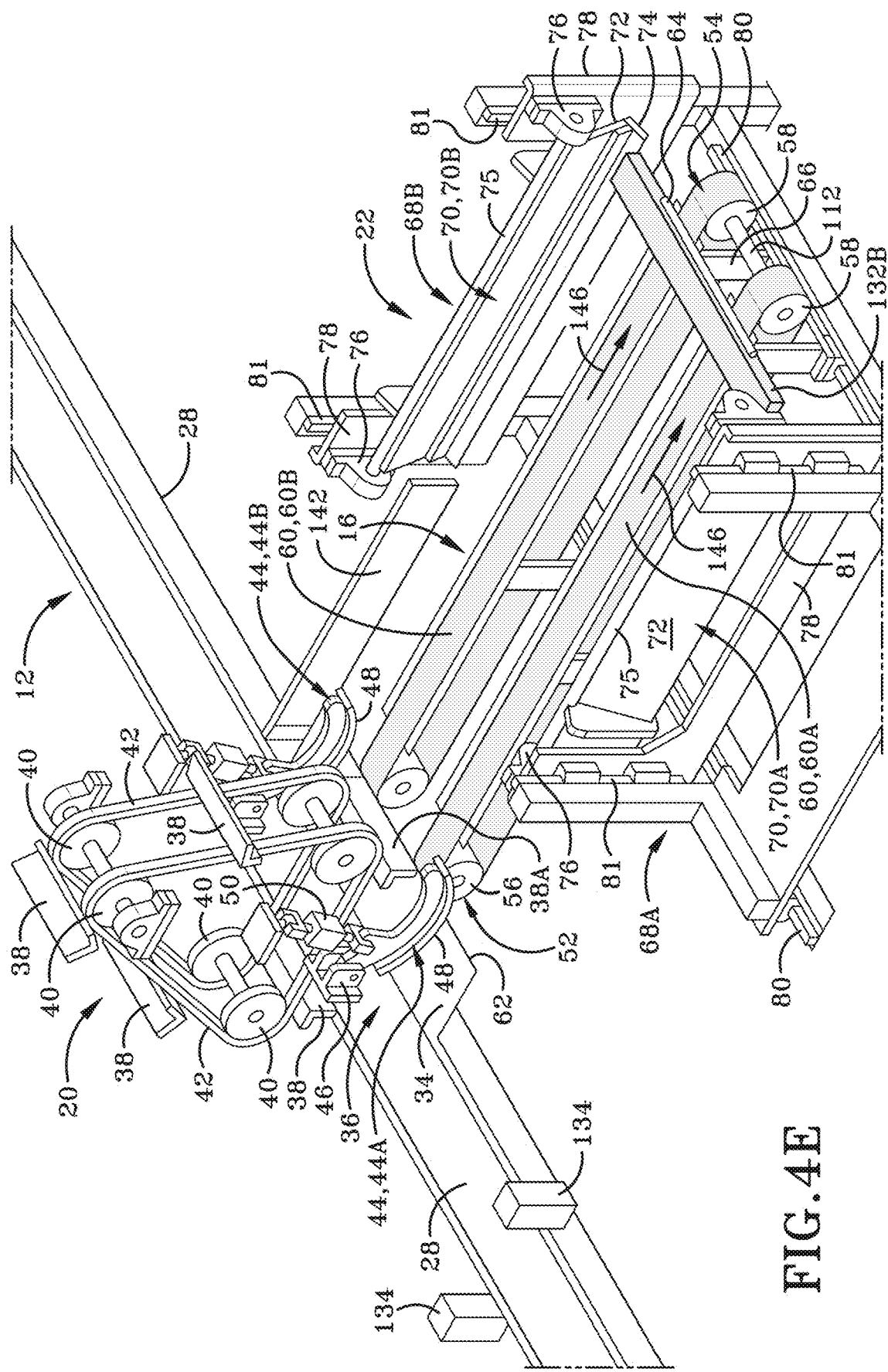
FIG. 4E is an operational view of the second conveyor moving the second object towards the accumulator and retaining the second object at a retention bar, wherein the components that are primarily referenced with respect to their operational description are shown shaded.

FIG. 4E indicates that the object 132B is moved along the second conveyor 16 via belt 60 or belts 60A, 60B in the transverse direction Y as indicated by arrows 146. More particularly, the conveyor belt 60 moves the object 132 from the first end of the conveyor towards the second end of the conveyor. Because the shown embodiment indicates that the second object 132B is the first object to be diverted to the second conveyor 16, a side of the object 132B will be retained by the retention bar 64 and held in place until a selected amount of objects is desired to be accumulated by the accumulator 22. While the object 132B is waiting to be accumulated with the other selected amount of objects that will be subsequently diverted by assembly 10 it remains stationary and held in place by the retention bar 64 and is located between the first portion 68A and the second portion 68B of the accumulator 22. The subsequent diverted objects will be aligned side-by-side between the first portion 68A and second portion 68B of accumulator 22.

Figure 4F:
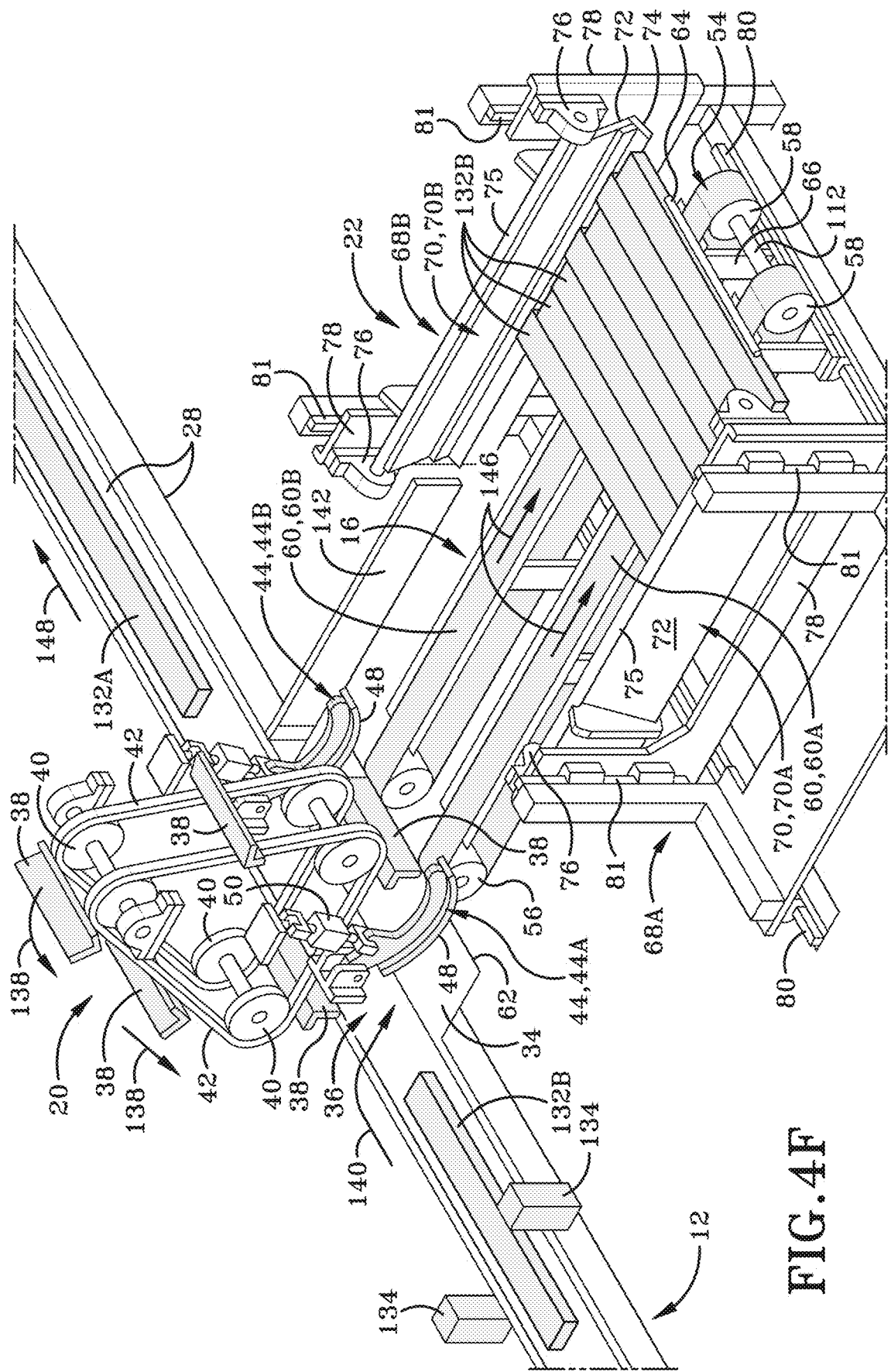
FIG. 4F is an operational view depicting multiple second objects being retained between the accumulator on the second conveyor, wherein the components that are primarily referenced with respect to their operational description are shown shaded.

FIG. 4F depicts the repetition of this process in which objects 132B having the desired amount of length to be stacked continue to be diverted as indicated by arrow 140 and retained in place by the retention bar 64 between the first portion 68A and the second portion 68B of accumulator 22. More particularly, the objects that are of the desired length, namely objects 132B are diverted as indicated by arrow 140 through the operation of diverter 20 to move the objects 132 along or in the direction indicated by arrows 146 via conveyor 60, and they are aligned side-by-side. Notably, when the objects 132B are side-by-side and retained by retention bar 64 their ends may not be exactly square as shown in FIG. 4F. This is the advantage of the accumulator 22, which will be described in greater detail below to square the ends of the accumulated objects 132B.

FIG. 4F also depicts another first object 132A that was sensed via sensors 134 to be of an insufficient or undesired dimension. This object 132A was not diverted by diverter 20 and continues to move along the first path of travel 14 on first conveyor 12 as indicated by arrow 148.

Figure 4G:
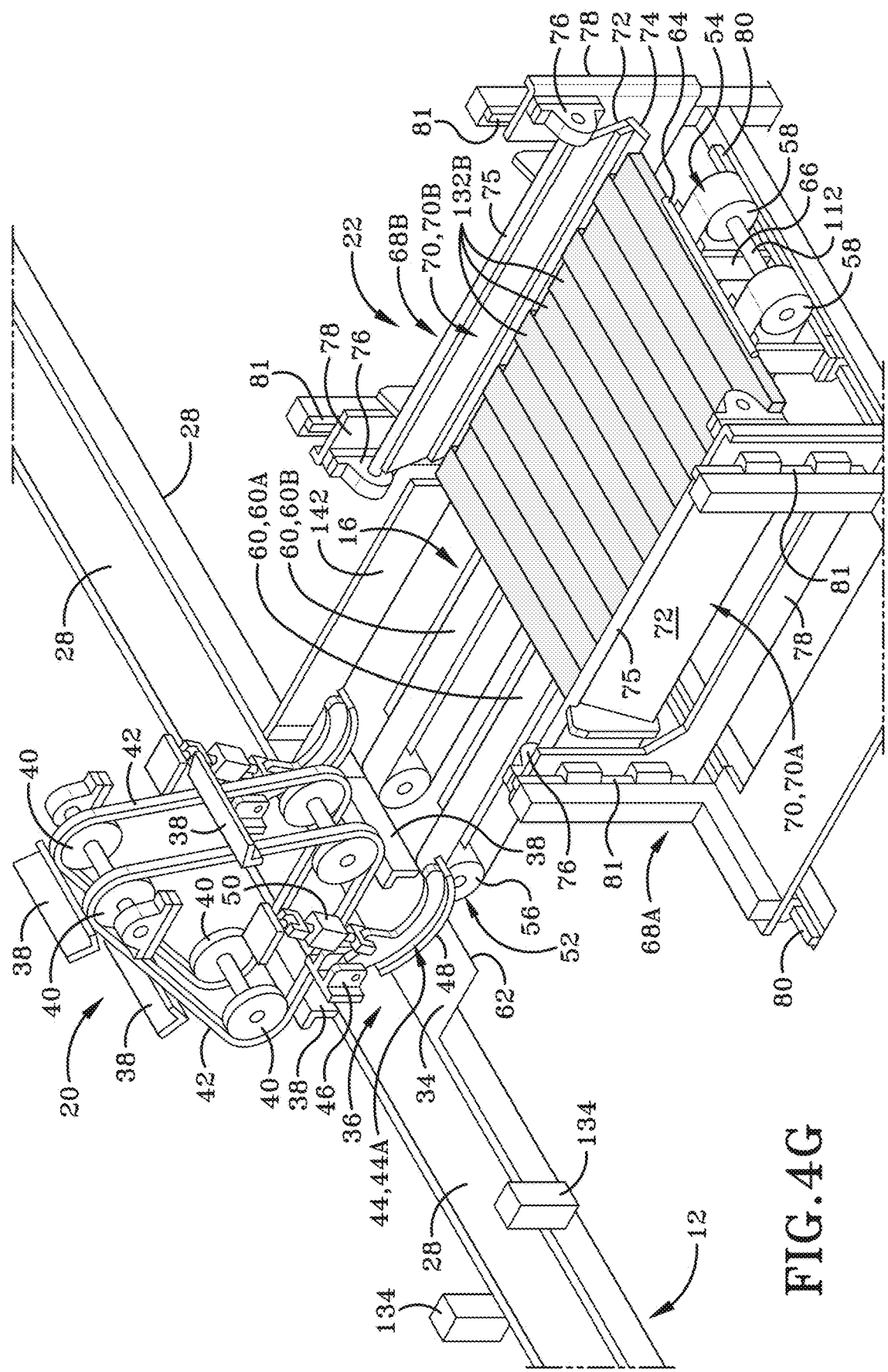
FIG. 4G is an operational view depicting a selected amount of objects retained on the second conveyor between the accumulator, wherein the components that are primarily referenced with respect to their operational description are shown shaded.

FIG. 4G depicts when the accumulator has accumulated the desired or selected amount of objects 132 that are to be stacked. In the shown embodiment, there are twelve objects 132B that are accumulated and ready to be squared so that they can be stacked onto the pallet. However, the ends of the objects 132B in FIG. 4G are not yet square and need to be squared by the accumulator 22. Furthermore, while twelve objects 132B are shown as the selected amount of objects, this number is exemplary and any number of objects may be the selected amount depending on the application specific needs or the desired size of the stack of objects that is to be created.

Figure 5B:
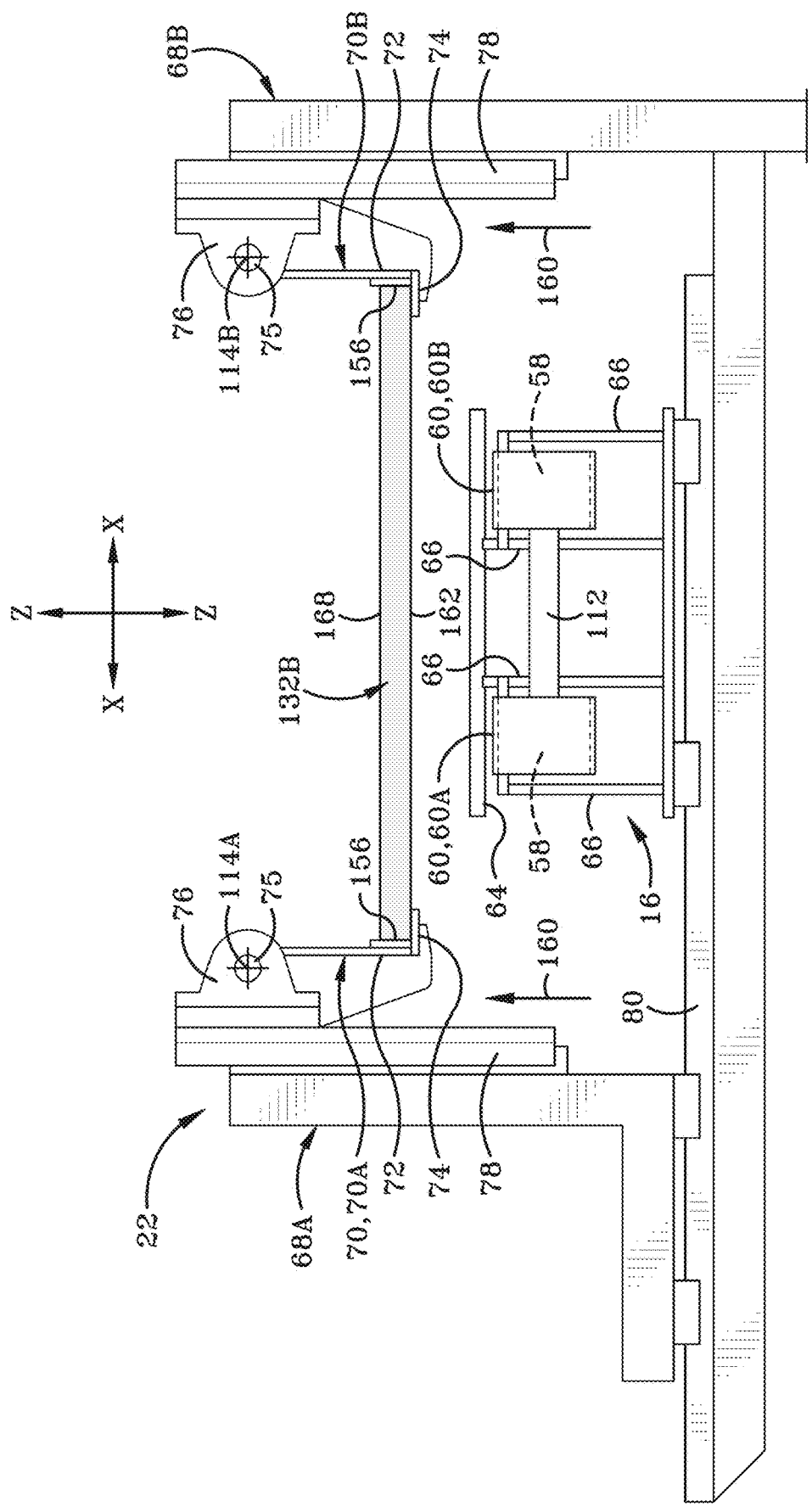
FIG. 5B is an operational end view of the accumulator lifting the objects from a lowered position to raised position.

FIG. 5A and FIG. 5B depict the operation of accumulator 22 after the desired amount of objects were retained by the retention bar 64 as indicated in FIG. 4G.

With respect to FIG. 5A, the riser member 78 on each portion 68A, 68B of the accumulator 22 are in their lowered position. First portion 68A translates along track 80 in the longitudinal direction X as shown by arrow 150 to move the L-shaped member 70A closer to the second L-shaped member 70B on the second portion 68B. Then, a motor, pneumatic assembly, or hydraulic assembly drives the L-shape members 70A, 70B to pivot about their respective at pivot axes 114A, 114B. The pivoting movement of first L-shaped member 70A is shown by arrow 152. The pivoting movement of the second L-shaped member 70B is shown by arrow 154. When the first L-shaped member 70A pivots about axis 114A in the direction of arrow 152 and the second L-shape member 170B pivots about pivot axis 114B in the direction of arrow 154, the upper legs 72 of each member 70A, 70B is aligned directly or nearly vertical. The ends of the objects 132B contact the upper first leg 72 of L-shaped members 70A, 70B, respectively. In one particular embodiment, a pad or plate 156 maybe attached the upper first leg 72 of each respective L-shape member 70A, 70B to assist with contacting the ends of the objects 132B. The contact of either the upper first leg 72 or the contact pad 156 assists to square the objects 132 relative to each other as the L-shaped members 70A, 70B are pivoted from their open position to their closed position such that the ends of objects 132B are all in alignment. The squaring of the objects 132B that were previously out of alignment as indicated in FIG. 4G, is represented by arrows 158.

FIG. 5B depicts that after the objects 132 have been squared, the ends of the objects 132B are supported by the lower second leg 74 on each respective L-shaped member 70A, 70B. A motor or pneumatic assemblies or hydraulic assemblies then may effectuate the vertical movement of the risers 78 to be lifted from a lowered position to a raised position as indicated by arrows 160. Raising the risers 78 causes the flange 76 to move upwardly and thereby imparts upward movement to the L-shaped members 70A, 70B inasmuch as the flange is rigidly connected with the risers 78. When the objects 132B are lifted to a raised position via the riser 78 coupled to the L-shaped members 70, the lower surface 162 is disposed vertically above the belt 60 or the pair of belts 60A, 60B.

Figure 6A:
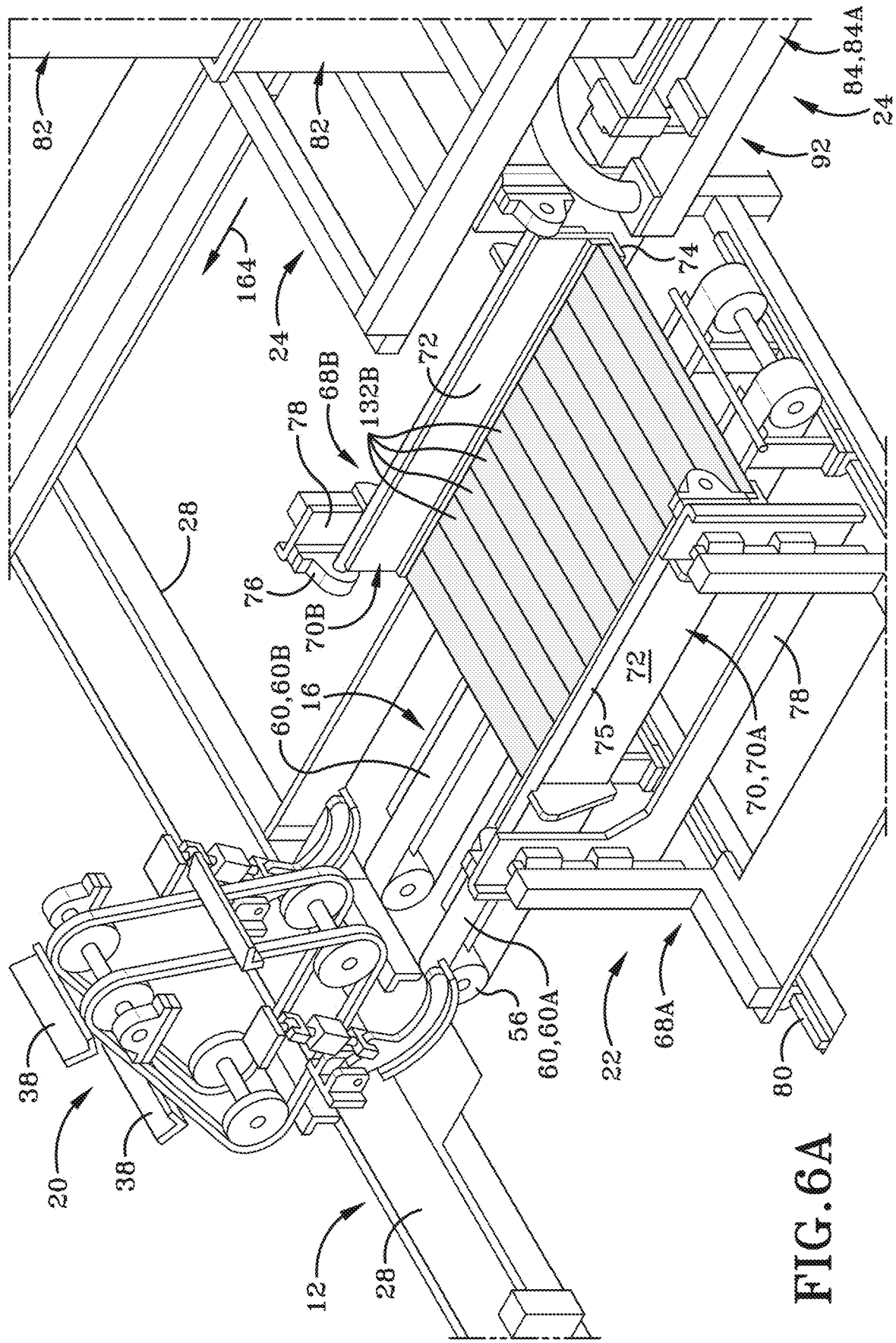
FIG. 6A is an operational view of the lift assembly moving towards the raised objects that are accumulated by the accumulator, wherein the components that are primarily referenced with respect to their operational description are shown shaded.

FIG. 6A depicts that when the objects 132B are squared and in the lifted or raised position (shown in FIG. 5B), then the lift assembly 24 may move towards the first position as indicated by arrow 164. Moving the lift assembly 24 to the first position in the direction of arrow 164 disposes the vacuum head assembly 92 vertically directly above the lifted, raised, and squared objects 132B. The movement of the lift assembly 24 may be accomplished by moving a carriage coupled to an upper end of the telescoping member 82 along a track when powered by a motor or pneumatic assemblies or hydraulic assemblies or the like. Alternatively, a different type of carriage assembly can be utilized to move the lift assembly between the first and second positions. During movement of the lift assembly 24 towards the first position, the lift assembly 24 will pass over the queuing assembly 100 and be disposed over the accumulator 22.

Figure 6B:
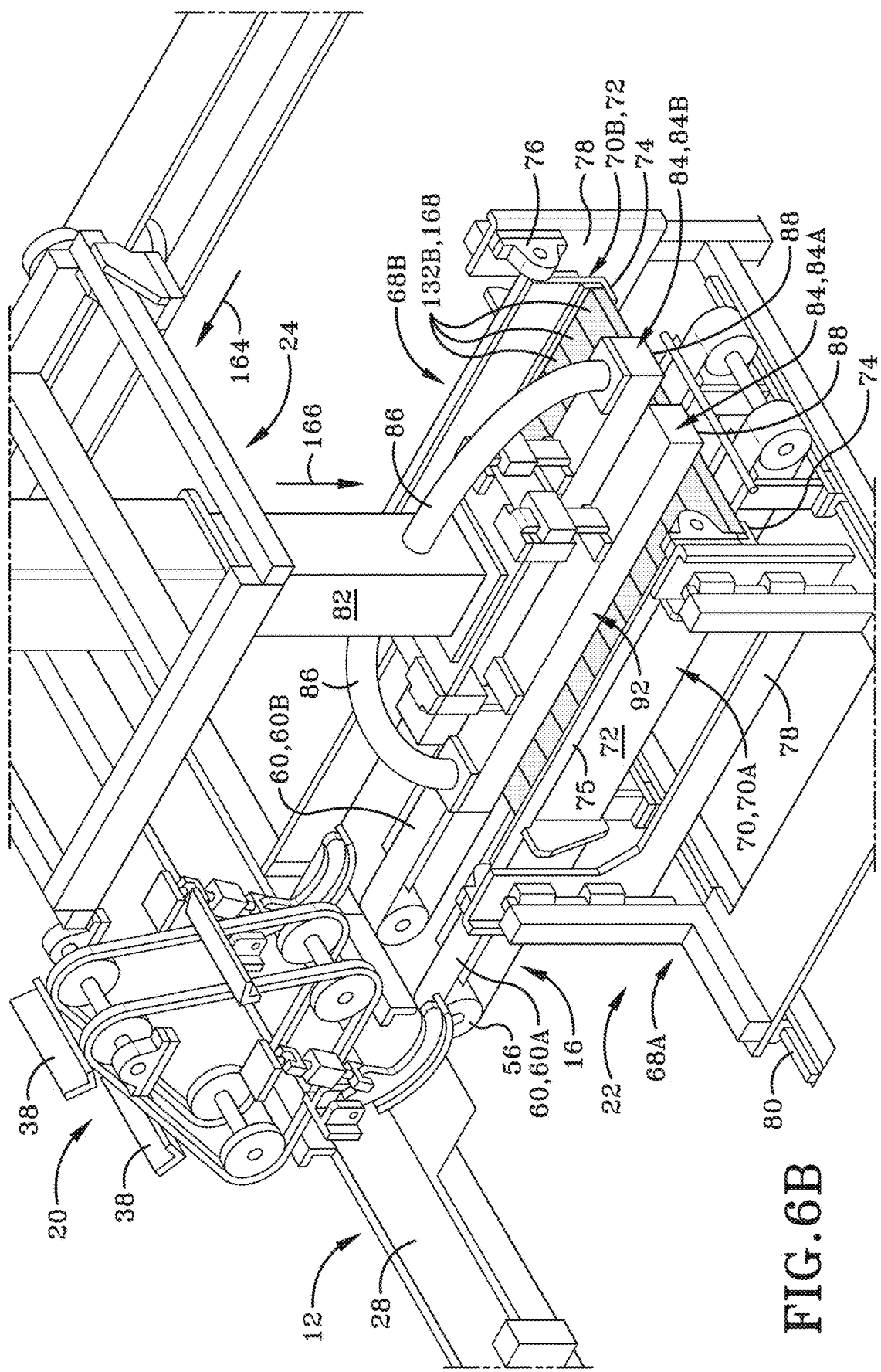
FIG. 6B is an operational view of the lift assembly being lowered to engage the objects accumulated by the accumulator, wherein the components that are primarily referenced with respect to their operational description are shown shaded.

FIG. 6B depicts that when the lift assembly 24 has been moved into its first position, the telescoping member 82 maybe extended downwardly, as indicated by arrow 166, in the vertical direction Z to lower the vacuum head assembly 92 towards the objects 132B. The vacuum head assembly 92 is continued to be lowered towards the objects 132B until the lower surface 88 of the vacuum plates 84A, 84B contacts the upper surface 168 of the objects 132B. Stated otherwise, the vertical spacing distance between the lower surface 88 of the vacuum plates 84A, 84B may be decreased as the vacuum head assembly 92 is lowered. The lowering of head assembly 92 continues until surface 88 contacts an upper surface 168 of the objects 132B. With the lower surface 88 of the vacuum plates 84A, 84B contacting the upper surface 168 of the objects 132B, a vacuum source may be activated to create a vacuum. The vacuum imparts suctioning power through hose 86 that is in fluid communication with the holes in the lower surface 88. The vacuum creates a suctioning force that engages the upper surface 168 of the objects 132B with the lower surface 88 of the vacuum plates 84A, 84B. The suctioning force imparted at the interface between the lower surface 88 and the upper surface 168 of the objects 132B is greater than the weight or gravitational downward force imparted to the objects 132B. Thus, the vacuum suctioning force should be sufficient to lift all of the objects 132B.

FIG. 6C depicts the lifting of the objects 132B from the accumulator 22. More particularly, while the vacuum suctioning force remains in effect, the telescoping member 82 is drawn upwardly into its collapsed position as indicated by arrow 170. The upward movements of the telescoping member 82 causes the vacuum head assembly 92 to raise upward while retaining the objects 132B in a squared alignment and retained only by the vacuuming force. As the objects 132B are lifted, they are released from their contact with the L-shaped members in the accumulator 22. While they are being lifted, the L-shaped members may remain in their raise and closed position. Alternatively, control logic may confirm that suctioning force is sufficient to lift the objects 132B, then simultaneous to when the objects 132B are lifted by the lift assembly 24 the L-shaped members revert to their open position.

Figure 6D:
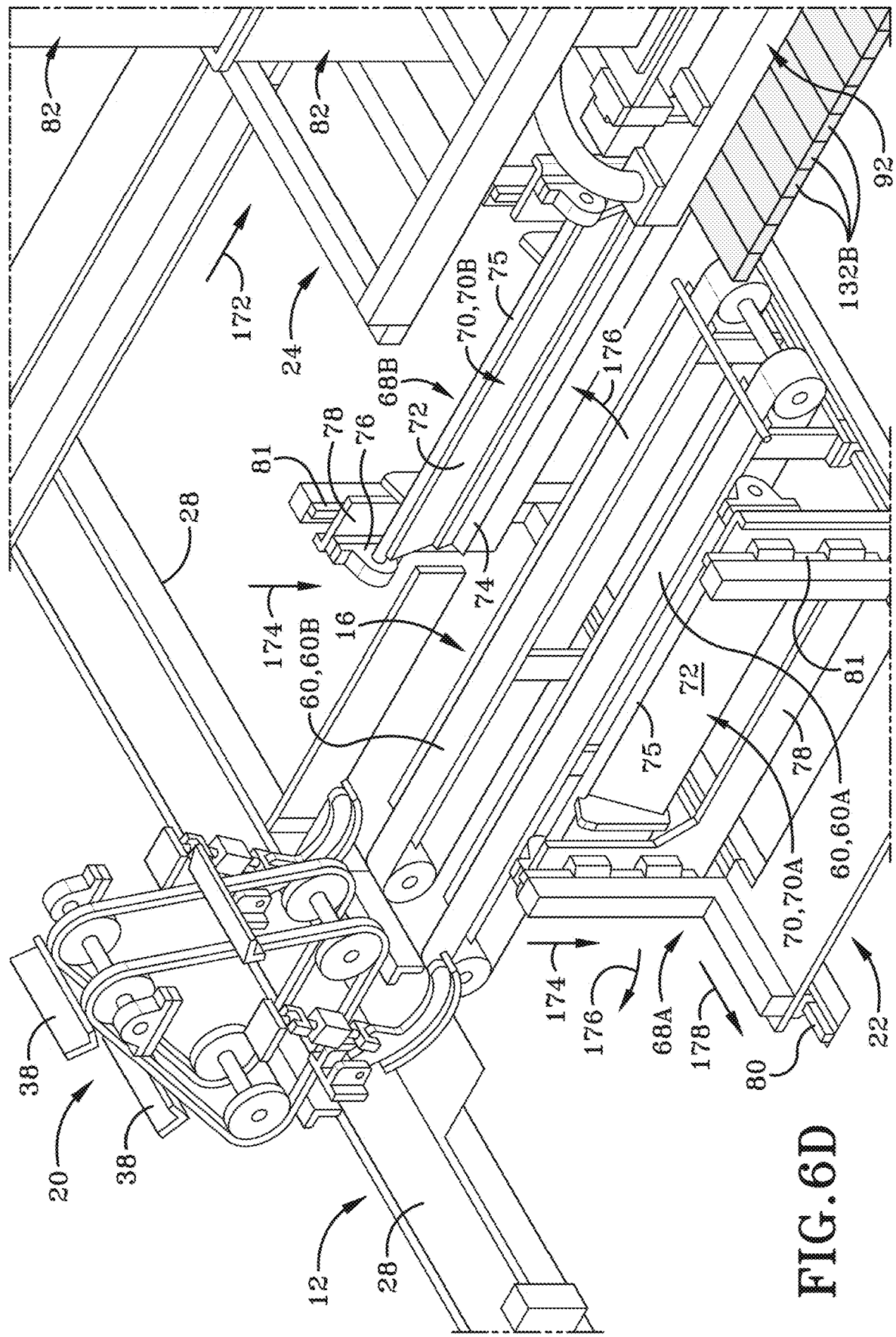
FIG. 6D is an operational view of the lift assembly carrying the objects from a first position towards a second position and the accumulator returning to its previous state, wherein the components that are primarily referenced with respect to their operational description are shown shaded.

FIG. 6D depicts that after the objects 132B have been lifted upwardly in a vertical direction Z, as indicated by arrow 170, the lift assembly 24 may move from the first position to the second position over the queuing assembly 100 as indicated by arrow 172. While the lift assembly is moving from the first position to the second position in the transverse direction Y, as indicated by arrow 172, the accumulator may return to its previous state so that it may accept and accumulate subsequent objects 132B so the process may repeat. To return the accumulator 22 to its previous position, the riser 78 are lowered as indicated by arrows 174, the L-shaped member 70A, 70B are pivoted outwardly about their respective pivot axes as indicated by arrows 176 back to their open position, and the first portion 68A is moved in the longitudinal direction X to its widened position as indicated by arrow 178A.

FIG. 6E depicts the translation of the objects 132B carried by the lift assembly 24 from the first position towards the second position as indicated by arrow 180. The objects 132B remain supported by the vacuum head assembly 92 via the suction forces exerted by the vacuum plates 84A, 84B. The vacuum head assembly 92 is translated towards the second position until the objects 132B are positioned above the queuing area 26 defined by queuing assembly 100. More particularly, the objects 132 are aligned directly vertically above the first pallet 120A that supports the cardboard sheet 128A.

Figure 6F:
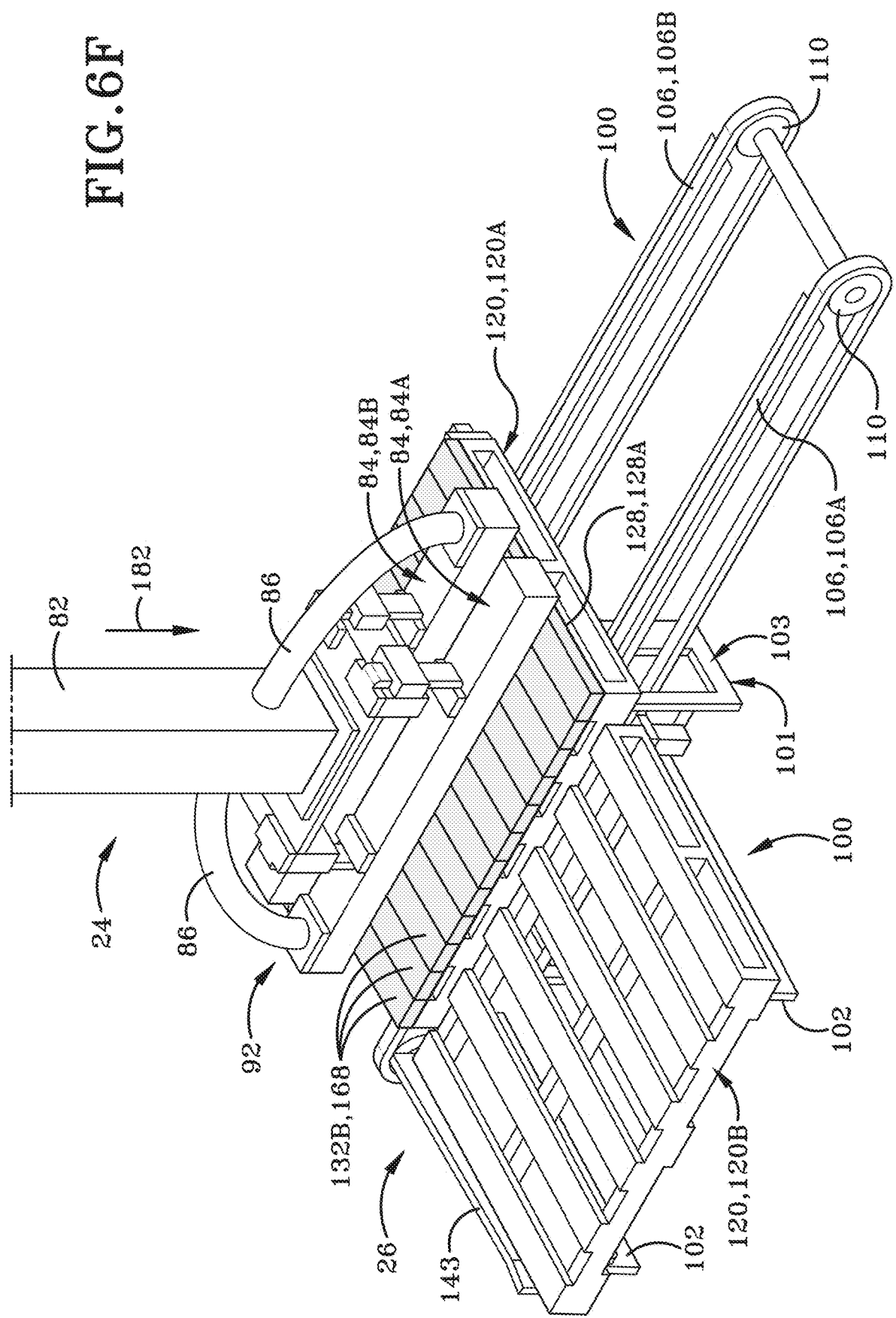
FIG. 6F is an operational view depicting the lowering of the objects onto the first pallet, wherein the components that are primarily referenced with respect to their operational description are shown shaded.

FIG. 6F depicts the lowering of the telescoping member 82, as indicated by arrow 182, downwardly in the vertical direction Z to place the objects 132B on top of the cardboard sheet 128A supported by first pallet 120A. The objects 132B remain connected via the suction force to the vacuum head assembly 92, and more particularly to the lower surface 88 of the vacuum plates 84A, 84B during the lowering of the telescoping member 82 in the downward direction indicated by arrow 182.

FIG. 6G depicts the placement of the objects 132B on the pallet 120A and the removal of the lift assembly 24 from its connection with the objects 132 in the vertical direction as indicated by arrow 184. To facilitate the release of the objects from the vacuum plates 84A, 84B the suction force created by the vacuum is turned off to allow the objects 132 to be released from the lower surface 88 of the vacuum plates 84A, 84B. Turning off the vacuum is controlled by control logic or computer program product associated with a variety of sensors that detect when the objects 132 had been properly placed on the pallet 120A. The telescoping member 82 is then retracted into its vertical position to position the vacuum head assembly 92 vertically above objects 132B that have been placed on pallet 120A.

FIG. 7 indicates that the process of creating one row of objects 132B stacked on the pallet 120A may be repeated a number of times. More particularly, the process identified with respect to FIG. 4A-6G may be repeated until a desired number of rows of objects 132B have been stacked on top of each other. More particularly, as the process repeats, the subsequent rows are built up on top of each other as indicated by a second row of objects 232B, a third row of objects 332B, a fourth row of objects 432B, and a fifth row of objects 532B. Having five rows of objects stacked on top of each other is merely exemplary and any number of rows could suffice depending on the application specific needs of the objects to be stacked. However, once a sufficient amount of objects have been stacked, such as in this instance five rows of objects, another sheet of cardboard material, such as second cardboard sheet 128B may be placed atop the uppermost surface of the top row of objects 532B. The placement of the second sheet of cardboard 128 maybe accomplished in a manner similar to that which was taught in FIG. 3C and FIG. 3D. Namely, the second sheet of cardboard 128A will be acquired via the lifting assembly and placed atop the stack of objects as indicated by arrow 186. The cardboard sheet of material may form an intermediate interface between the rows of objects and another layer of a plurality of rows of objects that will be placed on top of cardboard sheet 128B.

FIG. 8 depicts the stacking of five additional rows of objects atop those which were shown in FIG. 7, particularly a row of objects 632B, a row of objects 732B, a row of objects 832B, a ninth row of objects 932B, and a tenth row of objects 1032B, as well as a third cardboard sheet 128C may be placed as indicated by arrow 188.

Figure 9:
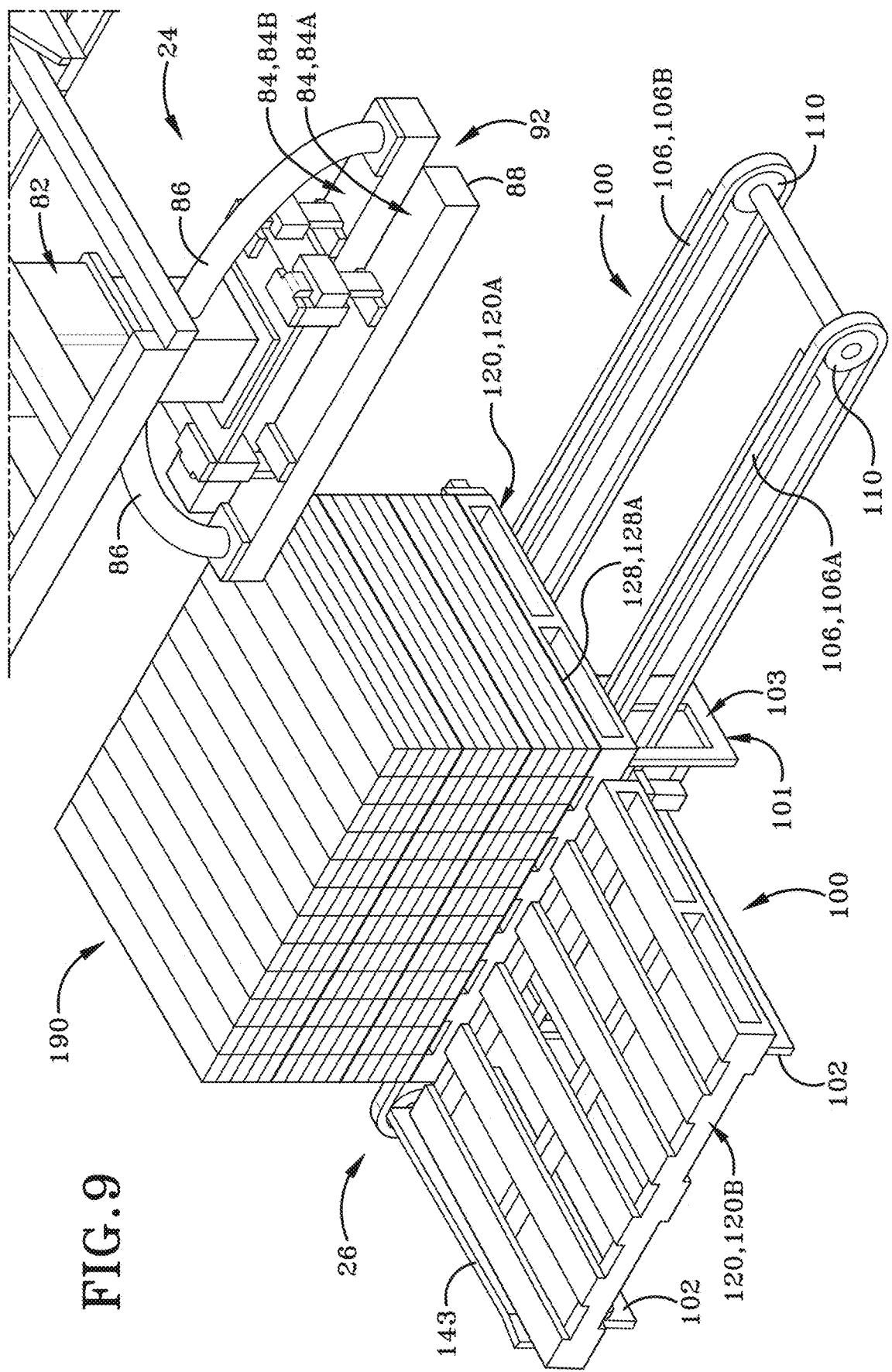
FIG. 9 is an operational view of a completed stack of objects on the queuing assembly.
Figure 10:
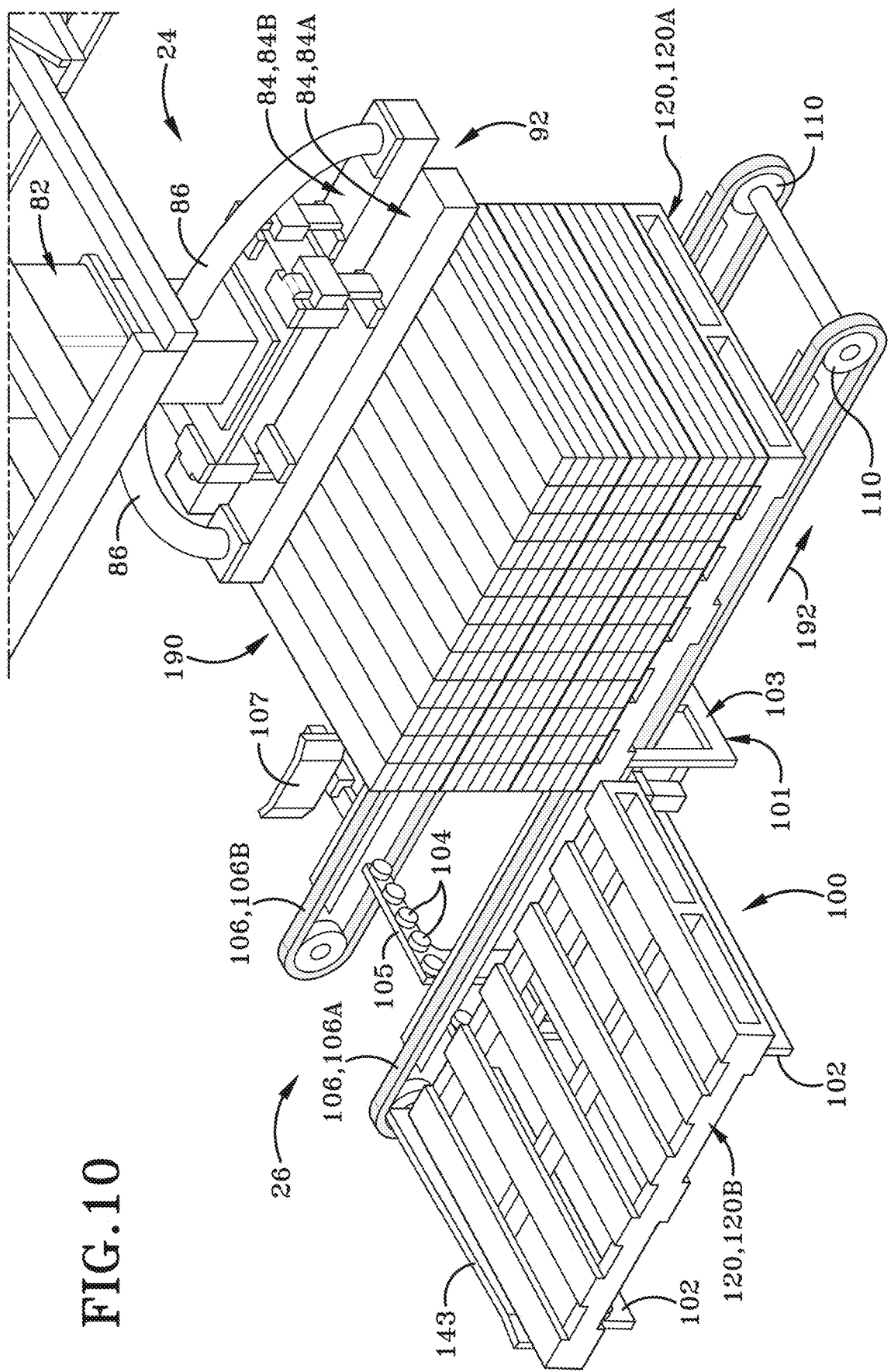
FIG. 10 is an operational view depicting the movement of the completed stack of objects for pickup by a forklift or other device.

FIG. 9 depicts a completed stack of objects 190 that are aligned and square relative to each other that are in the queuing area 26 defined by the queuing assembly 100. The stack of objects may be then ready for transport. To prepare the objects for transport, the stack 190 is moved in the transverse direction Y as indicated by arrow 192 as indicated in FIG. 10 by the movements of the conveyor belts 106A, 106B. A forklift or other device may then move the stacked and squared stack of objects 190 to a desired location for shipment, sail, or further processing.

Figure 11:
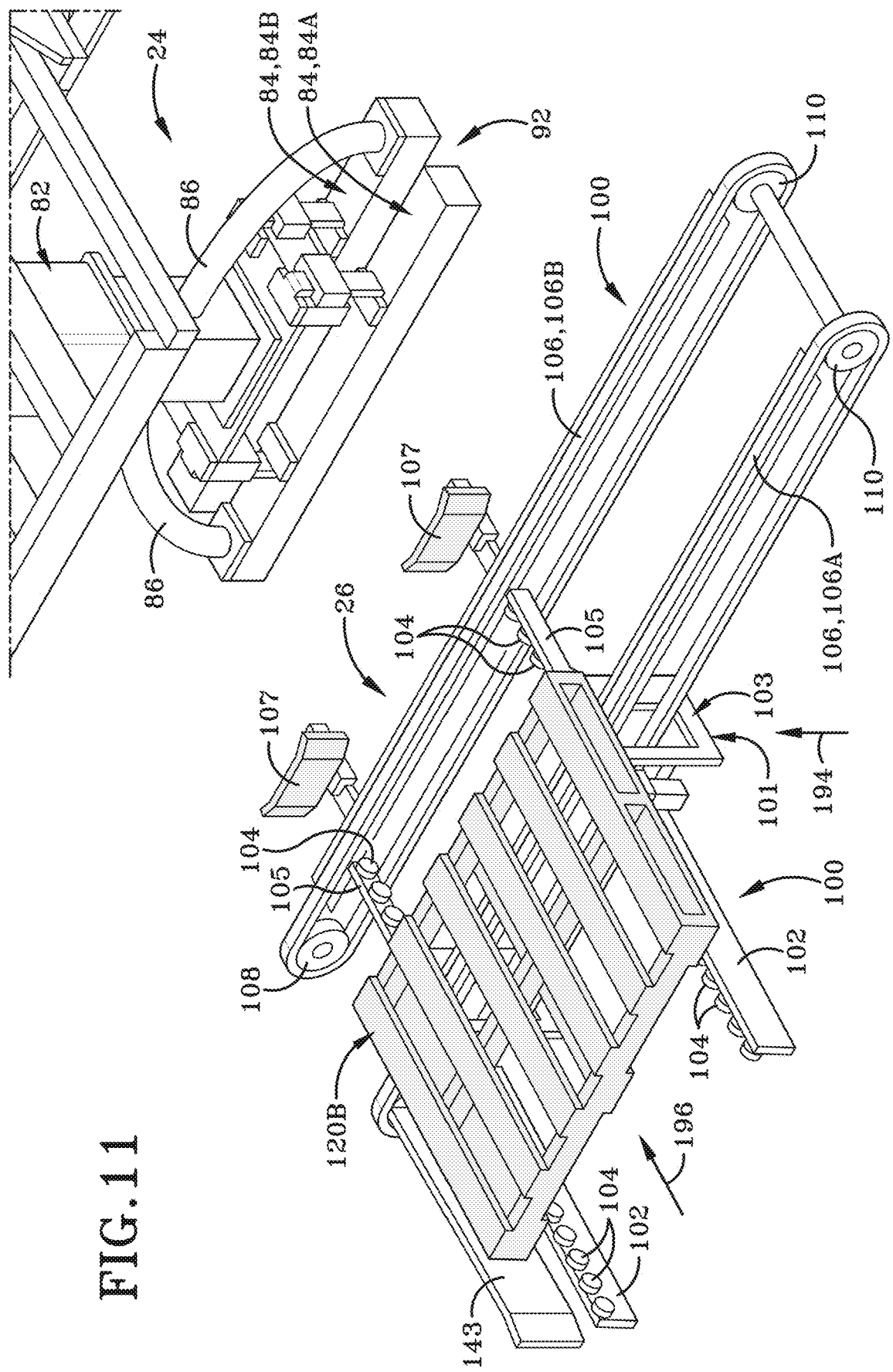
FIG. 11 is an operational view depicting the second pallet being moved in to a position formerly occupied by the first pallet so that the process identified in FIG. 3A-FIG. 10 may be repeated.

FIG. 11 depicts the repetition of the system when in order to start anew in which the second pallet 120B is moved into the position on the queuing assembly 100 that was formally occupied by pallet 120A. The lift frame 101 is raised as indicated in aby arrow 194. When the lift frame 101 is raided, the second pallet 120B is slid into the position as indicated by arrow 196 and the process detailed here in repeats itself beginning with that which was described with respect to FIG. 3A.

Having thus described the configuration and operation of assembly, reference is made to is placement on a "factory floor" with respect to other machinery or operations, along with other sundry details of the present disclosure.

Assembly 10 may be placed in any industry, factory, manufacturing, or similar environment in which object need handled in the manner described. When the objects 132A or 132B are wood staves, boards or planks, the assembly may be in operative communication with a cutting assembly or system. For example, the Assembly 10 may be installed in the factory operationally subsequent or "downstream" from the cutting assembly such that when objects 132A and 132B are cut or sawed by the cutting assembly, the objects 132A and 132B (i.e., cut wood staves/boards/planks) may be handled, diverted, and queued in the manner described herein. One exemplary cutting system that may be in operative communication with assembly 10 is detailed in U.S. patent application Ser. No. 18/050,065, which is commonly owned by the Applicant as of the priority date, and incorporated by reference herein as if fully re-written. As such, the output of the cutting assembly detailed in U.S. patent application Ser. No. 18/050,065 would be the input to the first conveyor 12 so the objects 132A or 132B can be queued. Another exemplary cutting system that may be in operative communication with assembly 10 is detailed in U.S. patent application Ser. No. 16/831,036, which is commonly owned by the Applicant as of the priority date, and incorporated by reference herein as if fully re-written. As such, the output of the cutting assembly detailed in U.S. patent application Ser. No. 16/831,036 would be the input to the first conveyor 12 so the objects 132A or 132B can be queued.

Further alternatively, assembly 10 may be installed in the factory operationally prior or "upstream" from the cutting assembly such that when stack of objects is created, they are on a pallet and may be unloaded to be further cut or sawed by the cutting assembly. In this configuration, the output from the stack of objects would be in the input to the cutting assembly detailed in U.S. patent application Ser. No. 18/050,065 or U.S. patent application Ser. No. 16/831,036.

The assembly 10 may additionally include one or more sensor to sense or gather data pertaining to the surrounding environment or operation of the assembly 10. Some exemplary sensors capable of being electronically coupled with the assembly 10 of the present disclosure (either directly connected to the assembly 10 or remotely connected thereto)

may include but are not limited to: accelerometers sensing accelerations experienced during rotation, translation, velocity/speed, location traveled, elevation gained; gyroscopes sensing movements during angular orientation and/or rotation, and rotation; altimeters sensing barometric pressure, altitude change, terrain climbed, local pressure changes, submersion in liquid; impellers measuring the amount of fluid passing thereby; Global Positioning sensors sensing location, elevation, distance traveled, velocity/speed; audio sensors sensing local environmental sound levels, or voice detection; Photo/Light sensors sensing ambient light intensity, ambient, Day/night, UV exposure; TV/IR sensors sensing light wavelength; Temperature sensors sensing machine or motor temperature, ambient air temperature, and environmental temperature; and Moisture Sensors sensing surrounding moisture levels.

The assembly 10 may include wireless communication logic coupled to sensors on the assembly 10. The sensors gather data and provide the data to the wireless communication logic. Then, the wireless communication logic may transmit the data gathered from the sensors to a remote device. Thus, the wireless communication logic may be part of a broader communication system, in which one or several assemblies 10 of the present disclosure may be networked together to report alerts and, more generally, to be accessed and controlled remotely. Depending on the types of transceivers installed in the assembly 10, the system may use a variety of protocols (e.g., Wifi, ZigBee, MiWi, Bluetooth) for communication. In one example, each of the assemblies 10 of the present disclosure may have its own IP address and may communicate directly with a router or gateway. This would typically be the case if the communication protocol is WiFi.

In another example, a point-to-point communication protocol like MiWi or ZigBee is used. One or more of the assembly 10 of the present disclosure may serve as a repeater, or the assemblies 10 of the present disclosure may be connected together in a mesh network to relay signals from one assembly 10 to the next. However, the individual assembly 10 in this scheme typically would not have IP addresses of their own. Instead, one or more of the assemblies 10 of the present disclosure communicates with a repeater that does have an IP address, or another type of address, identifier, or credential needed to communicate with an outside network. The repeater communicates with the router or gateway.

In either communication scheme, the router or gateway communicates with a communication network, such as the Internet, although in some embodiments, the communication network may be a private network that uses transmission control protocol/internet protocol (TCP/IP) and other common Internet protocols but does not interface with the broader Internet, or does so only selectively through a firewall.

The system that receives and processes signals from the assembly 10 of the present disclosure may differ from embodiment to embodiment. In one embodiment, alerts and signals from the assembly 10 of the present disclosure are sent through an e-mail or simple message service (SMS; text message) gateway so that they can be sent as e-mails or SMS text messages to a remote device, such as a smartphone, laptop, or tablet computer, monitored by a responsible individual, group of individuals, or department, such as a maintenance department. Thus, if a particular assembly 10 of the present disclosure creates an alert because of a data point gathered by one or more sensors, that alert can be sent, in e-mail or SMS form, directly to the individual responsible for fixing it. Of course, e-mail and SMS are only two examples of communication methods that may be used; in other embodiments, different forms of communication may be used.

In other embodiments, alerts and other data from the sensors on the assembly 10 of the present disclosure may also be sent to a work tracking system that allows the individual, or the organization for which he or she works, to track the status of the various alerts that are received, to schedule particular workers to repair a particular part or component of assembly 10 of the present disclosure, and to track the status of those repair jobs. A work tracking system would typically be a server, such as a Web server, which provides an interface individuals and organizations can use, typically through the communication network. In addition to its work tracking functions, the work tracker may allow broader data logging and analysis functions. For example, operational data may be calculated from the data collected by the sensors on the assembly 10 of the present disclosure, and the system may be able to provide aggregate machine operational data for an assembly 10 of the present disclosure or group of assemblies 10 of the present disclosure.

The system also allows individuals to access the assembly 10 of the present disclosure for configuration and diagnostic purposes. In that case, the individual processors or microcontrollers of the assembly 10 of the present disclosure may be configured to act as Web servers that use a protocol like hypertext transfer protocol (HTTP) to provide an online interface that can be used to configure the assembly 10. In some embodiments, the systems may be used to configure several devices, assemblies, or systems of the present disclosure at once. For example, if several devices, assemblies, or systems are of the same model and are in similar locations in the same location, it may not be necessary to configure the devices, assemblies, or systems individually. Instead, an individual may provide configuration information, including baseline operational parameters, for several devices, assemblies, or systems at once.

As described herein, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone may be utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

To the extent that the present disclosure has utilized the term "invention" in various titles or sections of this specification, this term was included as required by the formatting requirements of word document submissions pursuant to MPEP guidelines/requirements and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. An assembly for handling objects, the assembly comprising:
a first conveyor defining a first path of travel for the objects, wherein the first conveyor conveys the objects along the first path of travel;
a second conveyor defining a second path of travel for at least some of the objects, wherein the second path of travel is different than the first path of travel, and wherein the second conveyor conveys the at least some of the objects along the second path of travel;
a diverter to divert the at least some of the objects from the first conveyor moving along the first path of travel to the second conveyor to move the at least some of the objects along the second path of travel;
at least two hold down mechanisms that are spaced apart from each other, wherein the two hold-down mechanisms hold objects that have been diverted to the second conveyor, wherein a portion of the diverter moves between the at least two hold down mechanisms;
an accumulator in operative communication with the second conveyor, wherein the accumulator accumulates objects that were diverted until a selected amount of objects are accumulated;
a lift assembly to lift the selected amount of objects that were accumulated in the accumulator, wherein the lift assembly moves between a first position and a second position, and wherein when the lift assembly is in the first position, the lift assembly lifts the selected amount of objects and retains the selected amount of objects while the lift assembly moves toward the second position; and
a queuing assembly defining a queueing area, wherein the lift assembly moves to the second position to place the selected amount of objects on the queueing assembly in the queuing area, wherein the selected amount of objects that are placed onto the queueing assembly in the queuing area define a first layer of a stack of objects, wherein the lift assembly returns to the first position to lift another amount of selected objects and repeats the placement of selected objects in the queuing area to construct multiple layers of objects in the stack of objects.

2. An assembly for handling objects, the assembly comprising:
a first conveyor defining a first path of travel for the objects, wherein the first conveyor conveys the objects along the first path of travel;
a second conveyor defining a second path of travel for at least some of the objects, wherein the second path of travel is different than the first path of travel, and wherein the second conveyor conveys the at least some of the objects along the second path of travel;
a diverter to divert the at least some of the objects from the first conveyor moving along the first path of travel to the second conveyor to move the at least some of the objects along the second path of travel;
an accumulator in operative communication with the second conveyor, wherein the accumulator accumulates objects that were diverted until a selected amount of objects are accumulated, wherein the accumulator comprises:
 a first member on a first side of the second conveyor, wherein the first member pivots about a first pivot axis that is parallel to the second conveyor;
 a second member on a second side of the second conveyor, wherein the second member pivots about a second pivot axis that is parallel to the second conveyor; and
 wherein the first and second members pivot between a widened first position and a clamped second position, wherein when the selected amount of objects are squared relative to the each other when clamped by the first and second members having been moved from the widened first position to the clamped second position;
a lift assembly to lift the selected amount of objects that were accumulated in the accumulator, wherein the lift assembly moves between a first position and a second position, and wherein when the lift assembly is in the first position, the lift assembly lifts the selected amount of objects and retains the selected amount of objects while the lift assembly moves toward the second position; and
a queuing assembly defining a queueing area, wherein the lift assembly moves to the second position to place the selected amount of objects on the queueing assembly in the queuing area, wherein the selected amount of objects that are placed onto the queueing assembly in the queuing area define a first layer of a stack of objects, wherein the lift assembly returns to the first position to lift another amount of selected objects and repeats the placement of selected objects in the queuing area to construct multiple layers of objects in the stack of objects.

3. The assembly of claim 2, wherein the first member is an L-shaped member and the second member is an L-shaped member.

4. The assembly of claim 3, wherein the accumulator further comprises:
a first riser and a second riser, wherein the first riser is on a first portion of the accumulator disposed on the first side of the second conveyor and the second riser is on a second portion of the accumulator disposed on the second side of the second conveyor;
wherein the first member is coupled to the first riser and the second member is coupled to the second riser; and
wherein the first riser and the second riser are moveable in the vertical direction between a lowered position and a raised position.

5. The assembly of claim 4, wherein the accumulator further comprises:
a track in operative communication with the first portion of the accumulator to move in a direction that is perpendicular to the first pivot axis and the second pivot axis, wherein the first portion of the accumulator moves along the track between a widened position and a narrowed position, wherein the first member and the second member are closer to each other in the second position than the first position.

6. The assembly of claim 5, wherein the first and second risers move from the lowered position to raised position when the first portion of the accumulator is in the narrowed position.

7. The assembly of claim 2, wherein the accumulator further comprises:
a retention bar position near an end of the second conveyor, wherein the retention bar is configured to stop and retain the selected objects above the second conveyor such that the selected objects may be clamped by the first and second members of the accumulator.

8. The assembly of claim 2, further comprising:
wherein when the first and second members are in the clamped second position, the first and second arms move from a lowered position to a raised position along a vertical path of travel for the first and second arms with the objects retained between first and second arms.

9. An assembly for handling objects, the assembly comprising:
a first conveyor defining a first path of travel for the objects, wherein the first conveyor conveys the objects along the first path of travel;
a second conveyor defining a second path of travel for at least some of the objects, wherein the second path of travel is different than the first path of travel, and wherein the second conveyor conveys the at least some of the objects along the second path of travel;
a diverter to divert the at least some of the objects from the first conveyor moving along the first path of travel to the second conveyor to move the at least some of the objects along the second path of travel;
an accumulator in operative communication with the second conveyor, wherein the accumulator accumulates objects that were diverted until a selected amount of objects are accumulated;
a lift assembly to lift the selected amount of objects that were accumulated in the accumulator, wherein the lift assembly moves between a first position and a second position, and wherein when the lift assembly is in the first position, the lift assembly lifts the selected amount of objects and retains the selected amount of objects while the lift assembly moves toward the second position, wherein the lift assembly further comprises a vacuum head assembly on the lift assembly that is configured to suction lift the selected amount of objects from the accumulator and a first suction plate having a lower surface defining a plurality of holes that are in communication with a vacuum source that generates a suction force to be imparted through the plurality of holes to lift the selected amount of objects from the accumulator, wherein the lower surface of the first suction plate engages a surface of at least one of the selected objects retained between first and second L-shaped members of the accumulator in a raised position, wherein the first suction plate retains the selected objects when the first and second L-shaped pivotally return to a widened position and are moved to a lowered position; and
a queuing assembly defining a queueing area, wherein the lift assembly moves to the second position to place the selected amount of objects on the queueing assembly in the queuing area, wherein the selected amount of objects that are placed onto the queueing assembly in the queuing area define a first layer of a stack of objects, wherein the lift assembly returns to the first position to lift another amount of selected objects and repeats the placement of selected objects in the queuing area to construct multiple layers of objects in the stack of objects.

10. The assembly of claim 9, wherein the lift assembly further comprises:
a telescoping member oriented in a vertical direction having an upper end and a lower end, the telescoping member configured to lengthen and retract in a telescoping manner, and the vacuum head assembly coupled to the lower end of the telescoping member such that the vacuum head assembly lowers and raises as the telescoping member lengthens and retracts.

11. The assembly of claim 10, wherein telescoping member is configured to lengthen and retract in a telescoping manner at both the first position and the second position.

12. A method for handling objects, the method comprising:
determining that an object moving along a first path of travel has a desired dimension;
diverting, with a diverter, the object from the first path of travel to a second path of travel;
accumulating, with an accumulator, a plurality of objects having the desired dimension, wherein accumulating the plurality of objects is accomplished by:
retaining the plurality of objects atop a conveyor via a retention bar;
contacting respective ends of the plurality of objects with first and second L-shaped members on the accumulator;
squaring the plurality of objects with the first and second L-shaped members; and
raising the plurality of objects from a lowered position to a raised position with the first and second L-shaped members; and then;
transferring the plurality of objects from the accumulator to a queuing assembly;
repeating accumulation of objects having the desired dimension and transfer of objects from the accumulator to the queuing assembly;
creating a stack of objects with multiple layers of the plurality of objects; and
moving the stack of objects from the queuing assembly to another location.

13. The method of claim 12, wherein diverting the object from the first path of travel to the second path of travel is accomplished by:
moving a diversion plate across the first path of travel;
contacting the object with the diversion plate;
pushing the object with the diversion plate from the first path of travel to the second path of travel; and
moving a plurality of diversion plates around a loop.

14. The method of claim 13, further comprising:
holding the object that was diverted by the diverter in a hold-down mechanism comprising a cantilevered member, wherein the cantilevered member contacts an upper surface of the object while the object is diverted from the first path of travel to the second path of travel.

15. The method of claim 12, wherein transferring the plurality of objects from the accumulator to a queuing assembly is accomplished by:
lifting the plurality of objects with a lift assembly from the accumulator via a suctioning force;
translating the lift assembly and plurality of objects from a first position above the accumulator to a second position above the queuing assembly;
lowering the lift assembly;
releasing the suctioning force to place the plurality of objects onto a pallet or platform on the queuing assembly.

* * * * *